(12) United States Patent
Jung et al.

(10) Patent No.: US 9,182,569 B2
(45) Date of Patent: Nov. 10, 2015

(54) LENS MODULE

(71) Applicant: SAMSUNG ELECTRO-MECHANICS CO., LTD., Suwon (KR)

(72) Inventors: Jin Hwa Jung, Suwon (KR); Young Suk Kang, Suwon (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 14/102,485

(22) Filed: Dec. 10, 2013

(65) Prior Publication Data

US 2015/0085378 A1 Mar. 26, 2015

(30) Foreign Application Priority Data

Sep. 25, 2013 (KR) .................. 10-2013-0113702

(51) Int. Cl.
G02B 3/02 (2006.01)
G02B 13/18 (2006.01)
G02B 9/62 (2006.01)

(52) U.S. Cl.
CPC . *G02B 9/62* (2013.01); *G02B 13/18* (2013.01)

(58) Field of Classification Search
CPC .................................. G02B 13/18; G02B 9/62
USPC ........................................ 359/713, 757, 758
See application file for complete search history.

(56) References Cited

U.S. PATENT DOCUMENTS

2013/0003193 A1    1/2013  Huang
2014/0192422 A1*   7/2014  Tang et al. .................... 359/713

FOREIGN PATENT DOCUMENTS

KR    10-2010-0040357 A    4/2010
KR    10-20120135648 A    12/2012
WO    2012/169778 A2    12/2012

OTHER PUBLICATIONS

Office Action dated Aug. 29, 2014 for Korean Patent Application No. 10-2013-0113702 and its English summary provided by Applicant's foreign counsel.

* cited by examiner

*Primary Examiner* — William Choi
(74) *Attorney, Agent, or Firm* — NSIP Law

(57) ABSTRACT

There is provided a lens module including: a first lens having refractive power and having a shape in which an image-side surface is concave; a second lens having refractive power; a third lens having positive refractive power; a fourth lens having positive refractive power; a fifth lens having negative refractive power; and a sixth lens having refractive power and having a point of inflection formed on an image-side surface thereof.

33 Claims, 16 Drawing Sheets

LENS MODULE

CROSS-REFERENCE TO RELATED APPLICATIONS

This application claims the benefit of Korean Patent Application No. 10-2013-0113702 filed on Sep. 25, 2013, with the Korean Intellectual Property Office, the disclosure of which is incorporated in its entirety herein by reference.

BACKGROUND

The present disclosure relates to a lens module, and more specifically, to a lens module including an optical imaging system including six lenses.

Portable terminals commonly include cameras, so that a video calls and photography are possible. In addition, as the functionality of in portable terminals has gradually increased, demand for high resolution and high performance cameras for use therein has correspondingly increased.

However, since portable terminals have tended to be gradually miniaturized and lightened, there is a limitation in implementing high resolution and high performance cameras therein.

In order to solve this problem, camera lenses have recently been manufactured using plastic, which is lighter than glass, and a lens module has been configured using five or more lenses in order to implement a high level of resolution therein.

However, with the use of such lenses formed of plastic, there are greater difficulties in improving chromatic aberrations as well as in implementing a relatively bright optical system, as compared to the use of a lens formed of glass.

As the related art associated with the present disclosure, there are provided Patent Documents 1 and 2. Patent Documents 1 and 2 disclose lens modules including six lenses.

RELATED ART DOCUMENT (Patent Document 1) KR2012-0135648 A
(Patent Document 2) US2013-0003193 A1

SUMMARY

An aspect of the present disclosure may provide a lens module capable of improving an aberration improving effect and implementing high resolution.

According to an aspect of the present disclosure, a lens module may include: a first lens having refractive power and having a shape in which an image-side surface is concave; a second lens having refractive power; a third lens having positive refractive power; a fourth lens having positive refractive power; a fifth lens having negative refractive power; and a sixth lens having refractive power and having a point of inflection formed on an image-side surface thereof.

The first lens may have a shape in which an object-side surface thereof is convex.

The second lens may have a shape in which an object-side surface thereof is convex.

The fifth lens may have a shape in which an image-side surface thereof is convex.

The sixth lens may have negative refractive power.

At least one of the first to sixth lenses may be formed of plastic.

At least one of an object-side surface and an image-side surface of at least one of the first to sixth lenses may be an aspherical surface.

An optical system including the first to sixth lenses may satisfy the following Conditional Equation 1:

$$TTL/f<1.3 \qquad \text{[Conditional Equation 1]}$$

where TTL may indicate a distance [mm] from an object-side surface from the first lens to an image surface, and f may indicate a focal length [mm] of the overall optical system.

An optical system including the first to sixth lenses may satisfy the following Conditional Equation 2:

$$|V2-V3|<33 \qquad \text{[Conditional Equation 2]}$$

where V2 may indicate the Abbe number of the second lens, and V3 may indicate the Abbe number of the third lens.

An optical system including the first to sixth lenses may satisfy the following Conditional Equation 3:

$$|Nd4-Nd5|<0.1 \qquad \text{[Conditional Equation 3]}$$

where Nd4 may indicate a refractive index of the fourth lens, and Nd5 may indicate a refractive index of the fifth lens.

An optical system including the first to sixth lenses may satisfy the following Conditional Equation 4:

$$|f3/f|<60 \qquad \text{[Conditional Equation 4]}$$

where f3 may indicate a focal length [mm] of the third lens, and f may indicate a focal length [mm] of the overall optical system.

An optical system including the first to sixth lenses may satisfy the following Conditional Equation 5:

$$|r9/f5|<0.2 \qquad \text{[Conditional Equation 5]}$$

where r9 may indicate a radius of curvature [mm] of an object-side surface of the fifth lens, and f5 may indicate a focal length [mm] of the fifth lens.

An optical system including the first to sixth lenses may satisfy the following Conditional Equation 6:

$$|(r5+r6)/(r5-r6)|<16 \qquad \text{[Conditional Equation 6]}$$

where r5 may indicate a radius of curvature [mm] of an object-side surface of the third lens, and r6 may indicate a radius of curvature [mm] of an image-side surface of the third lens.

An optical system including the first to sixth lenses may satisfy the following Conditional Equation 7:

$$|r3/f2|<2.6 \qquad \text{[Conditional Equation 7]}$$

where r3 may indicate a radius of curvature [mm] of an object-side surface of the second lens, and f2 may indicate a focal length [mm] of the second lens.

An optical system including the first to sixth lenses may satisfy the following Conditional Equation 8:

$$f3/f4>3.0 \qquad \text{[Conditional Equation 8]}$$

where f3 may indicate a focal length [mm] of the third lens, and f4 may indicate a focal length [mm] of the fourth lens.

An optical system including the first to sixth lenses may satisfy the following Conditional Equation 9:

$$V6-V5>30 \qquad \text{[Conditional Equation 9]}$$

where V5 may indicate the Abbe number of the fifth lens, and V6 may indicate the Abbe number of the sixth lens.

According to another aspect of the present disclosure, a lens module may include: a first lens having positive refractive power and having a shape in which an image-side surface is concave; a second lens having refractive power and having a shape in which an object-side surface is convex; a third lens having positive refractive power; a fourth lens having positive refractive power; a fifth lens having negative refractive power; and a sixth lens having refractive power and having a point of inflection formed on an image-side surface thereof.

The first lens may have a shape in which an object-side surface thereof is convex.

The second lens may have negative refractive power.

The second lens may have a shape in which an image-side surface thereof is concave.

The fifth lens may have a shape in which an image-side surface thereof is convex.

The sixth lens may have negative refractive power.

At least one of the first to sixth lenses may be formed of plastic.

At least one of an object-side surface and an image-side surface of at least one of the first to sixth lenses may be an aspherical surface.

An optical system including the first to sixth lenses may satisfy the following Conditional Equation 1:

$$TTL/f<1.3 \qquad \text{[Conditional Equation 1]}$$

where TTL may indicate a distance [mm] from an object-side surface from the first lens to an image surface, and f may indicate a focal length [mm] of the overall optical system.

An optical system including the first to sixth lenses may satisfy the following Conditional Equation 2:

$$|V2-V3|<33 \qquad \text{[Conditional Equation 2]}$$

where V2 may indicate the Abbe number of the second lens, and V3 may indicate the Abbe number of the third lens.

An optical system including the first to sixth lenses may satisfy the following Conditional Equation 3:

$$|Nd4-Nd5|<0.1 \qquad \text{[Conditional Equation 3]}$$

where Nd4 may indicate a refractive index of the fourth lens, and Nd5 may indicate a refractive index of the fifth lens.

An optical system including the first to sixth lenses may satisfy the following Conditional Equation 4:

$$|f3/f|<60 \qquad \text{[Conditional Equation 4]}$$

where f3 may indicate a focal length [mm] of the third lens, and f may indicate a focal length [mm] of the overall optical system.

An optical system including the first to sixth lenses may satisfy the following Conditional Equation 5:

$$|r9/f5|<0.2 \qquad \text{[Conditional Equation 5]}$$

where r9 may indicate a radius of curvature [mm] of an object-side surface of the fifth lens, and f5 may indicate a focal length [mm] of the fifth lens.

An optical system including the first to sixth lenses may satisfy the following Conditional Equation 6:

$$|(r5+r6)/(r5-r6)|<16 \qquad \text{[Conditional Equation 6]}$$

where r5 may indicate a radius of curvature [mm] of an object-side surface of the third lens, and r6 may indicate a radius of curvature [mm] of an image-side surface of the third lens.

An optical system including the first to sixth lenses may satisfy the following Conditional Equation 7:

$$|r3/f2|<2.6 \qquad \text{[Conditional Equation 7]}$$

where r3 may indicate a radius of curvature [mm] of an object-side surface of the second lens, and f2 may indicate a focal length [mm] of the second lens.

An optical system including the first to sixth lenses may satisfy the following Conditional Equation 8:

$$f3/f4>3.0 \qquad \text{[Conditional Equation 8]}$$

where f3 may indicate a focal length [mm] of the third lens, and f4 may indicate a focal length [mm] of the fourth lens.

An optical system including the first to sixth lenses may satisfy the following Conditional Equation 9:

$$V6-V5>30 \qquad \text{[Conditional Equation 9]}$$

where V5 may indicate the Abbe number of the fifth lens, and V6 may indicate the Abbe number of the sixth lens.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In addition, in the present specification, a first lens refers to a lens closest to an object side, and a sixth lens refers to a lens closest to an image side. Further, a front side refers to the object side of a lens module, and a rear side refers to an image sensor or image side of the lens module. In addition, a first surface of each lens refers to a surface closest to the object side (or an object-side surface), and a second surface of each lens refers to a surface close to the image side (or an image-side surface). Further, in the present specification, units of all of radii of curvature, thicknesses, through the lens (TTL) metering, and focal lengths f, f1, f2, f3, f4, f5, and f6 of the lenses are provided in millimeters (mm), unless particularly described.

Figure 1:
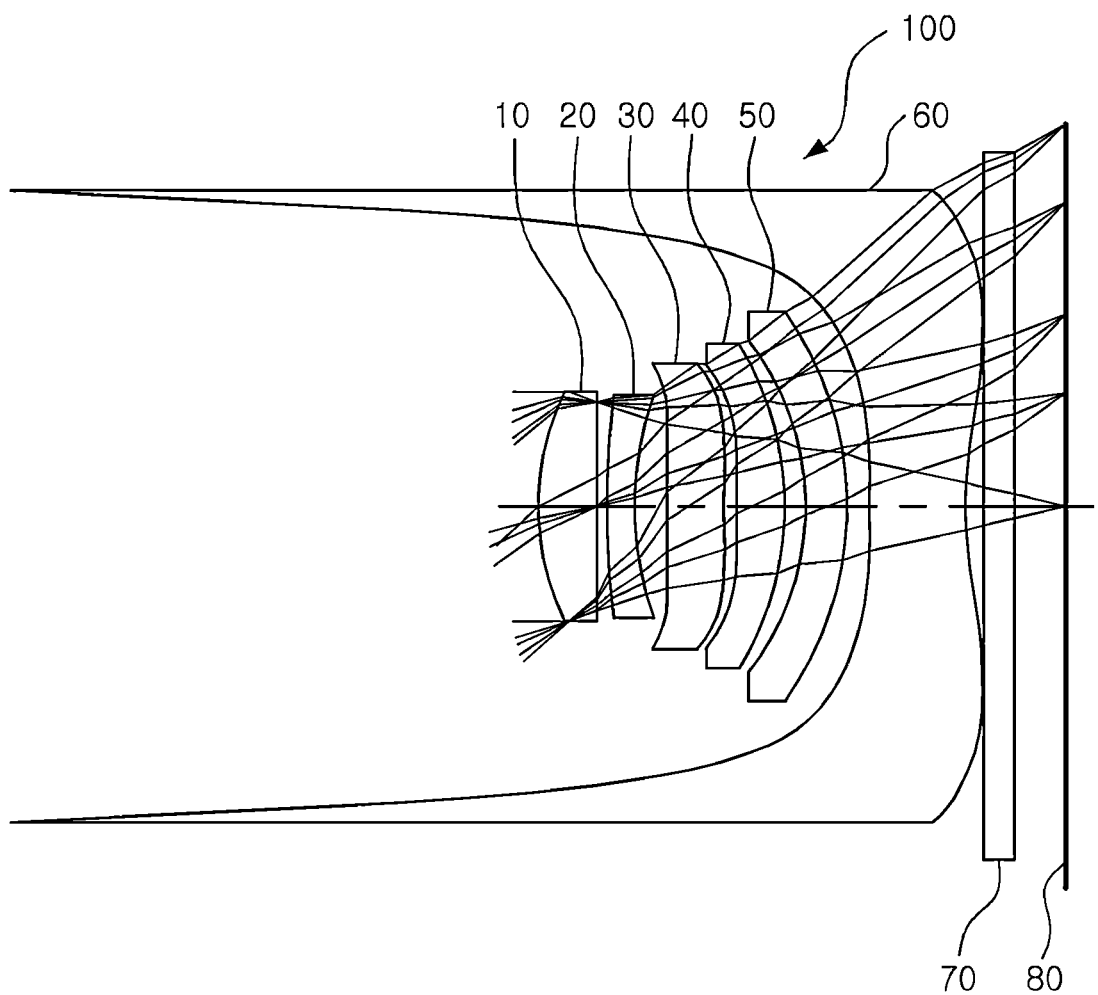
FIG. 1 is a configuration diagram of a lens module according to a first exemplary embodiment of the present disclosure.
Figure 2:
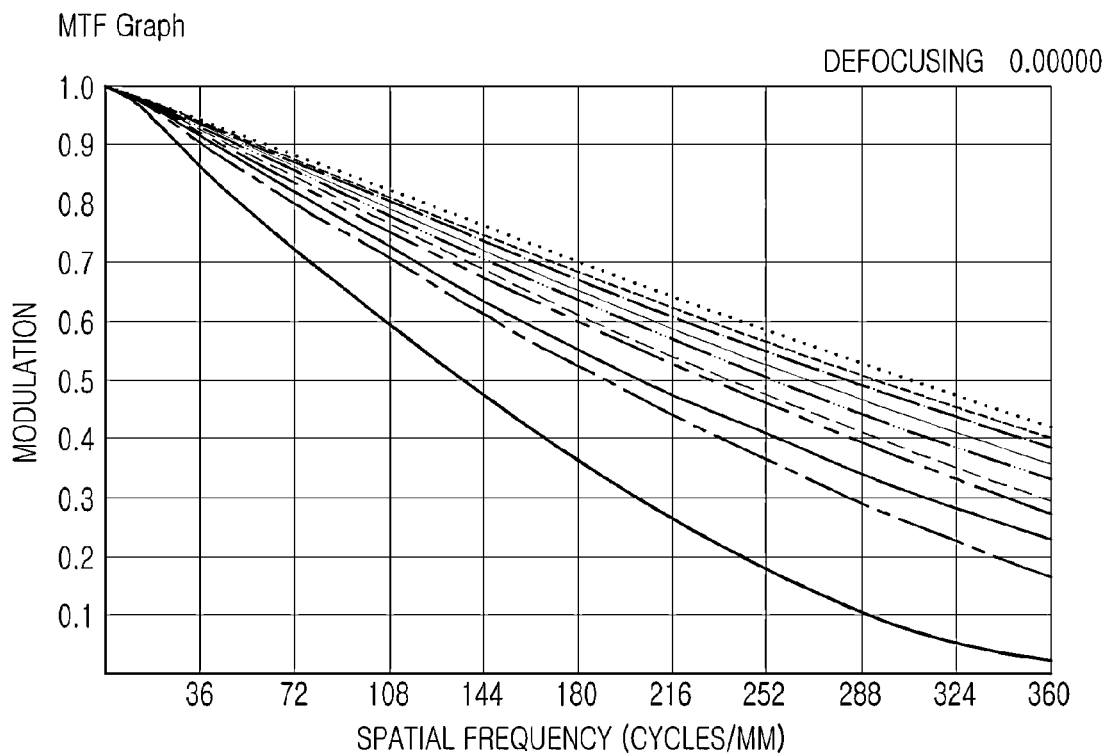
FIG. 2 is a curve showing a modulation transfer function (MTF) of the lens module shown in FIG. 1.
Figure 3:
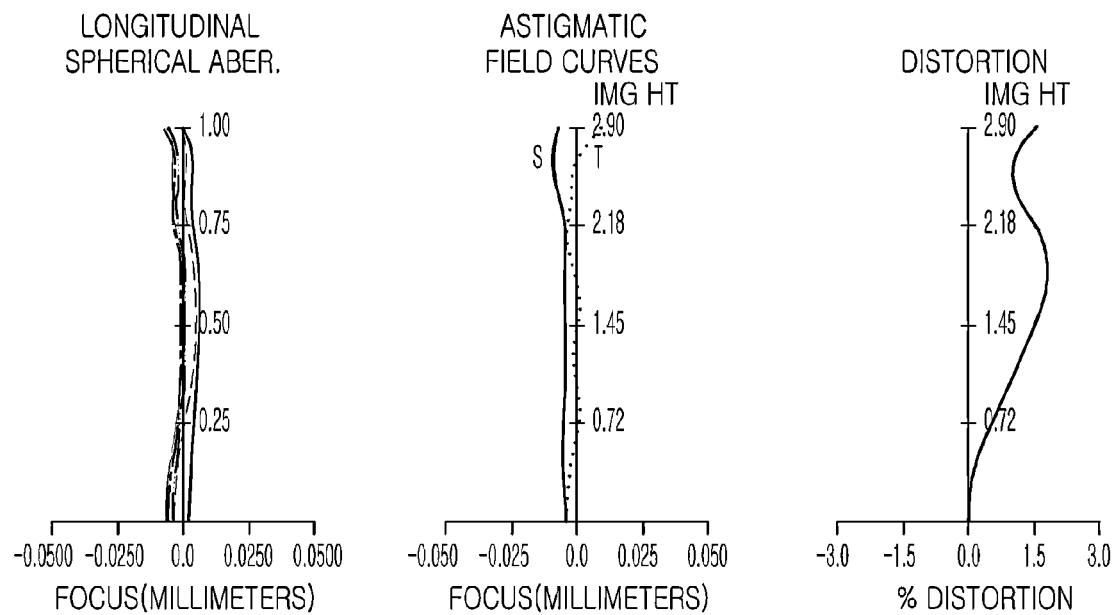
FIG. 3 is a curve showing aberration characteristics of the lens module shown in FIG. 1.
Figure 4:
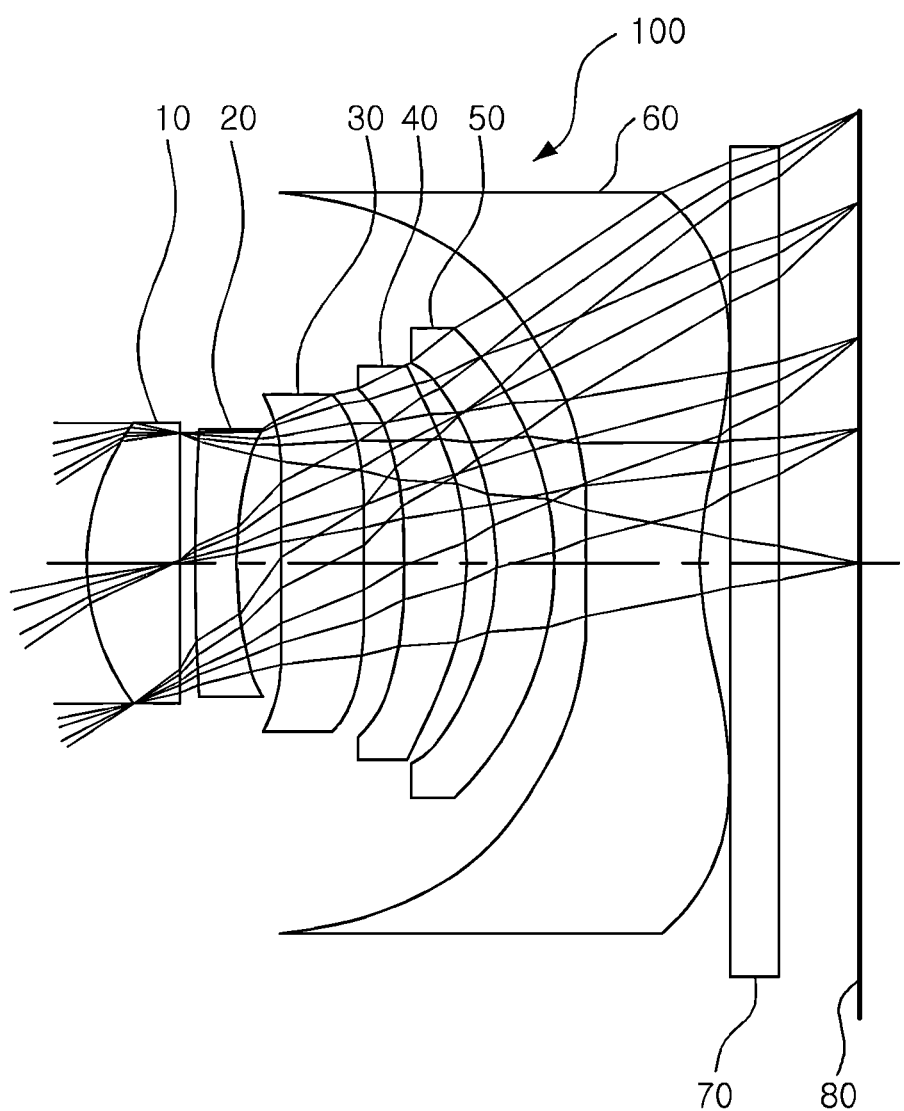
FIG. 4 is a configuration diagram of a lens module according to a second exemplary embodiment of the present disclosure.
Figure 5:
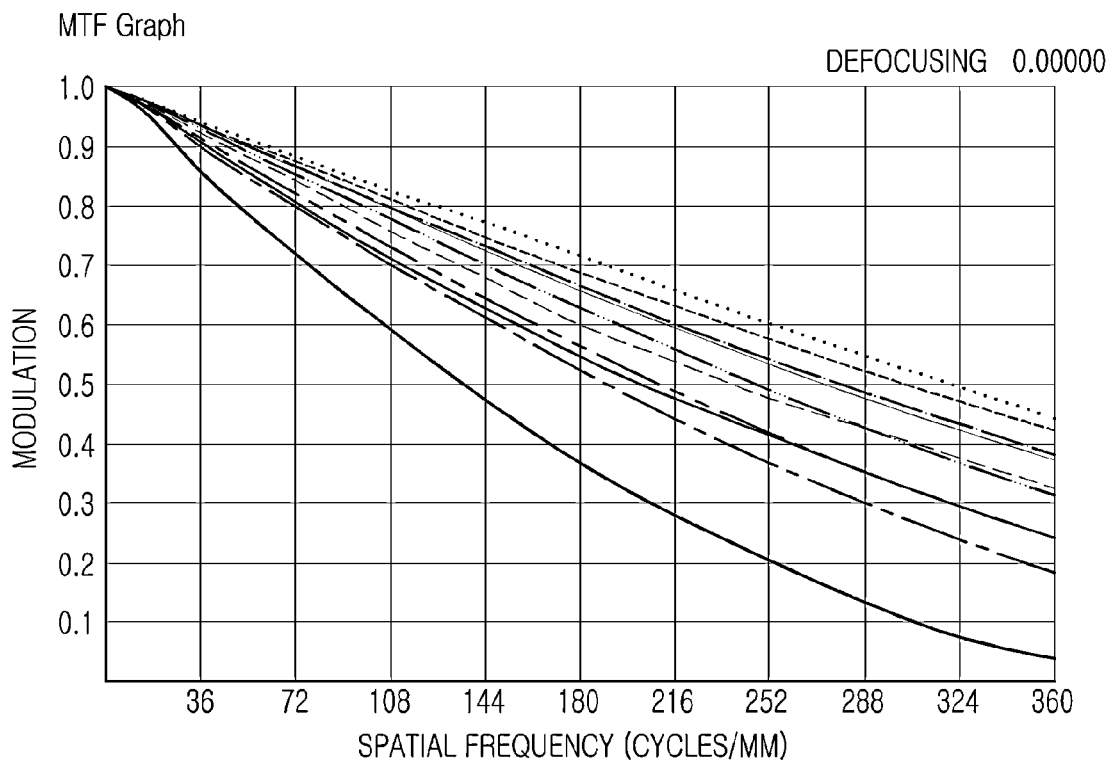
FIG. 5 is a curve showing an MTF of the lens module shown in FIG. 4.
Figure 6:
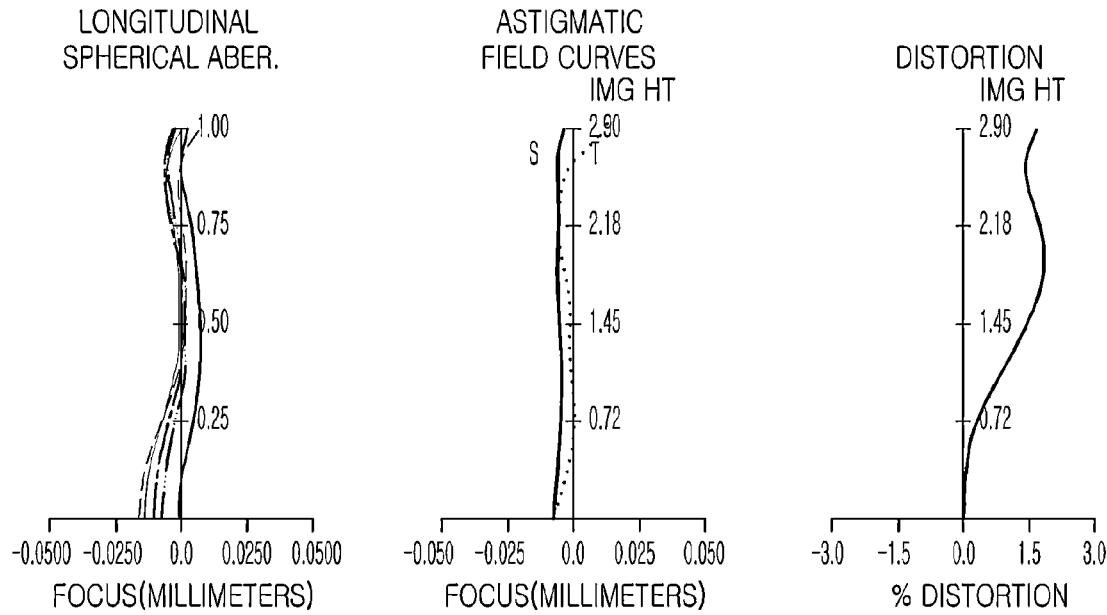
FIG. 6 is a curve showing aberration characteristics of the lens module shown in FIG. 4.
Figure 7:
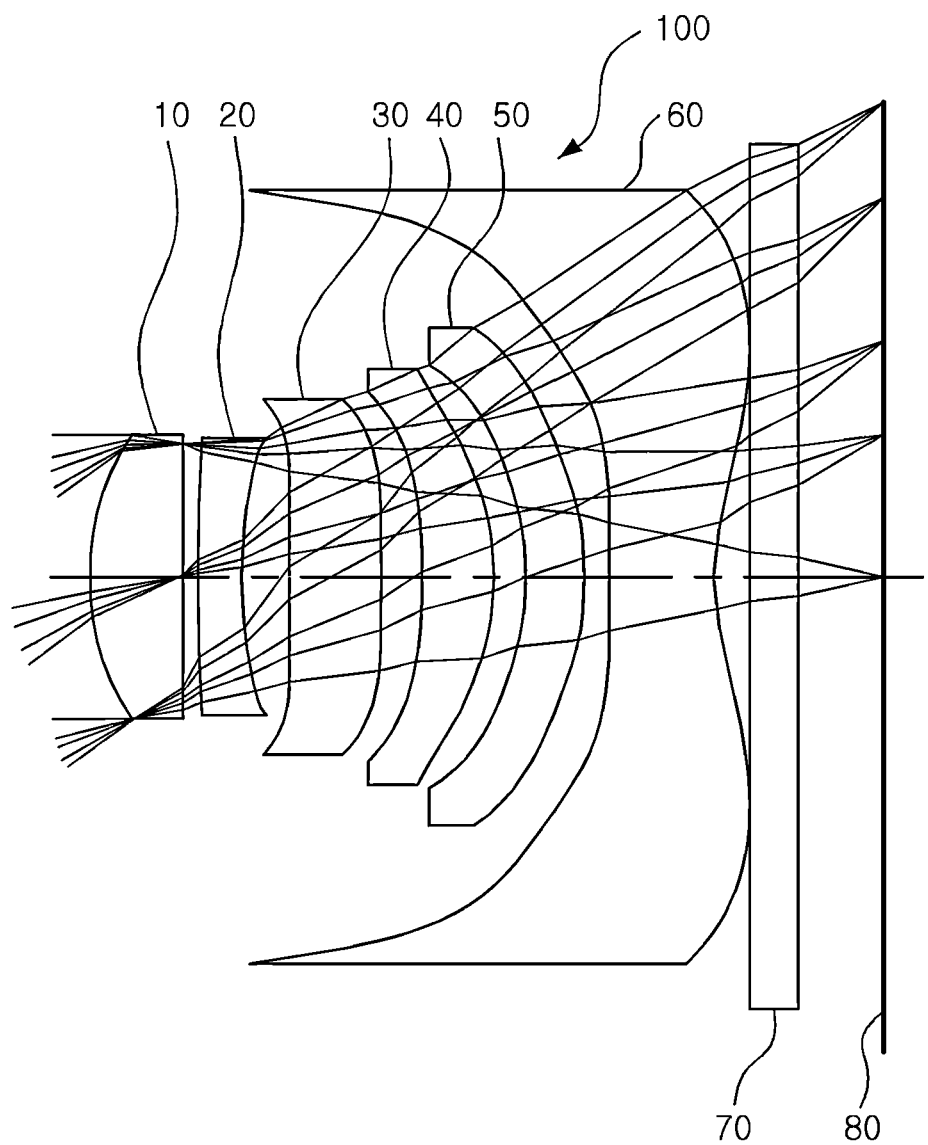
FIG. 7 is a configuration diagram of a lens module according to a third exemplary embodiment of the present disclosure.
Figure 8:
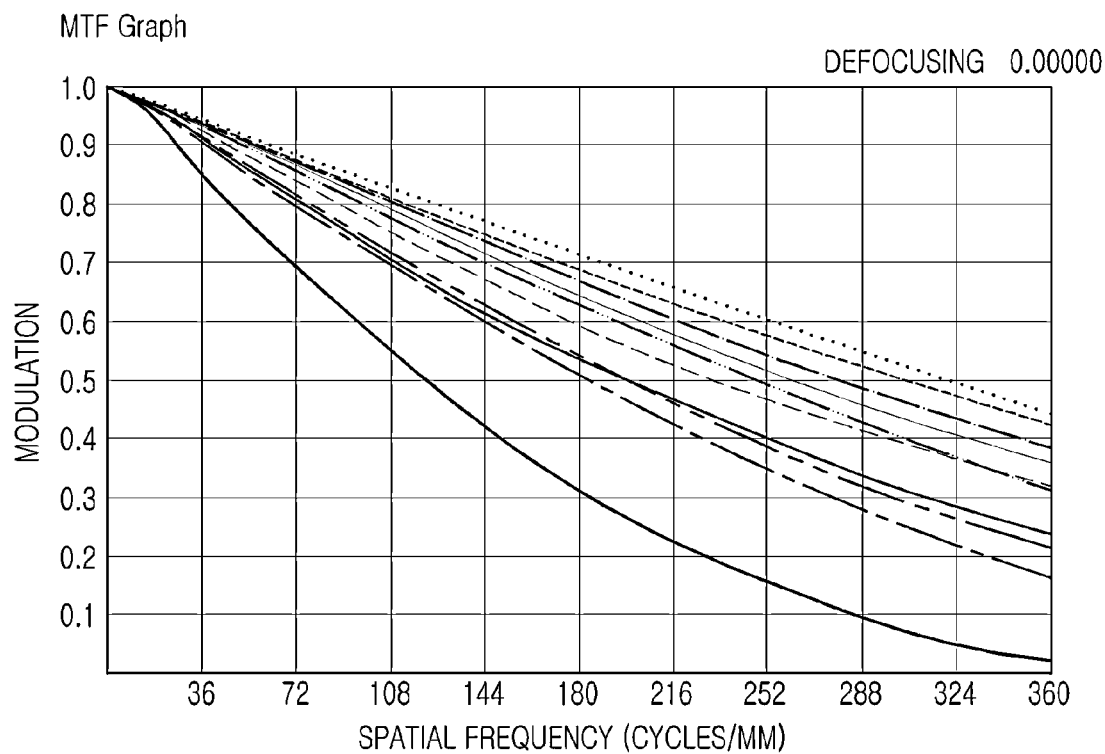
FIG. 8 is a curve showing an MTF of the lens module shown in FIG. 7.
Figure 9:
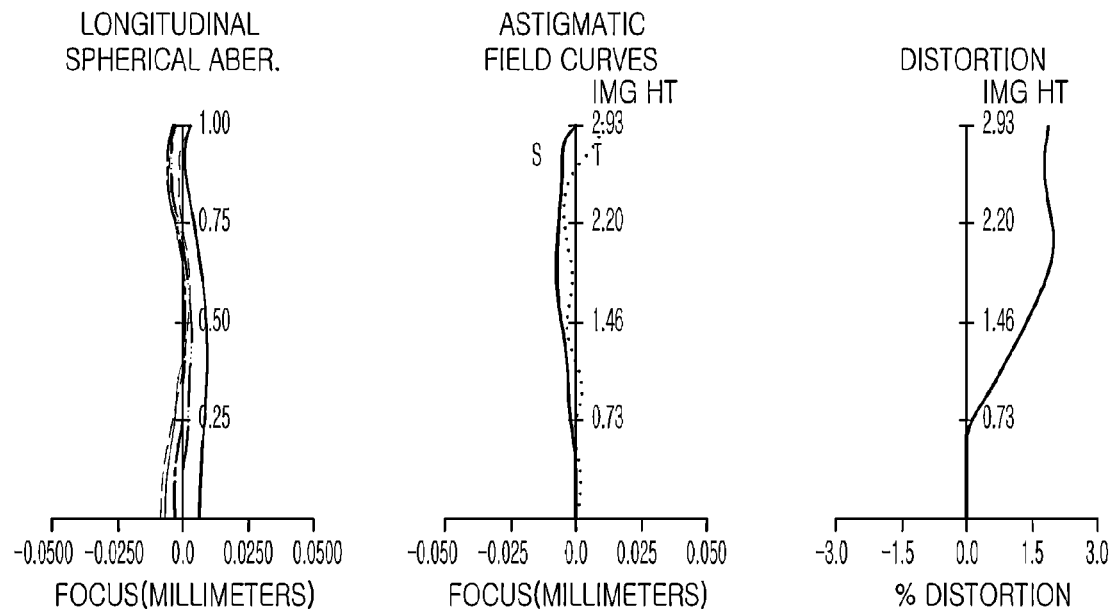
FIG. 9 is a curve showing aberration characteristics of the lens module shown in FIG. 7.
Figure 10:
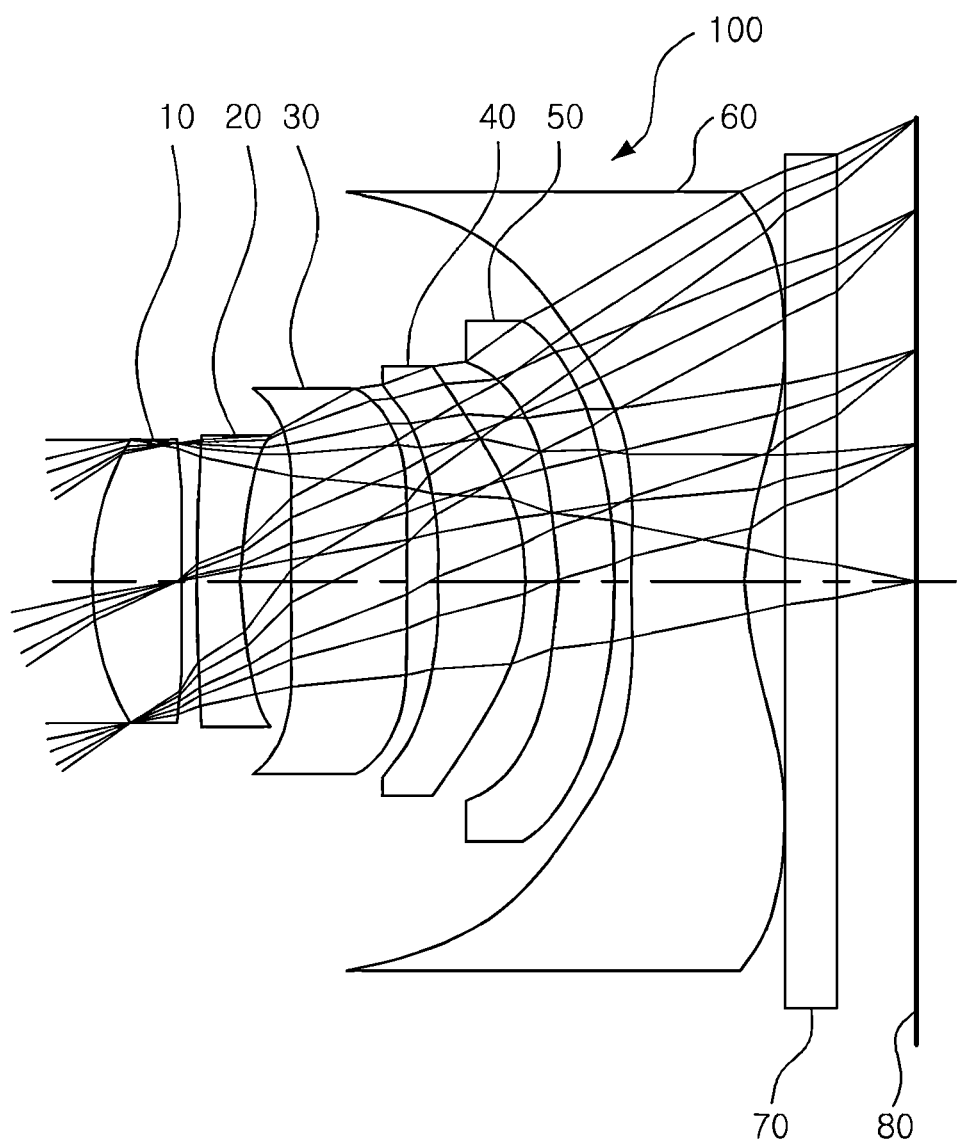
FIG. 10 is a configuration diagram of a lens module according to a fourth exemplary embodiment of the present disclosure.
Figure 11:
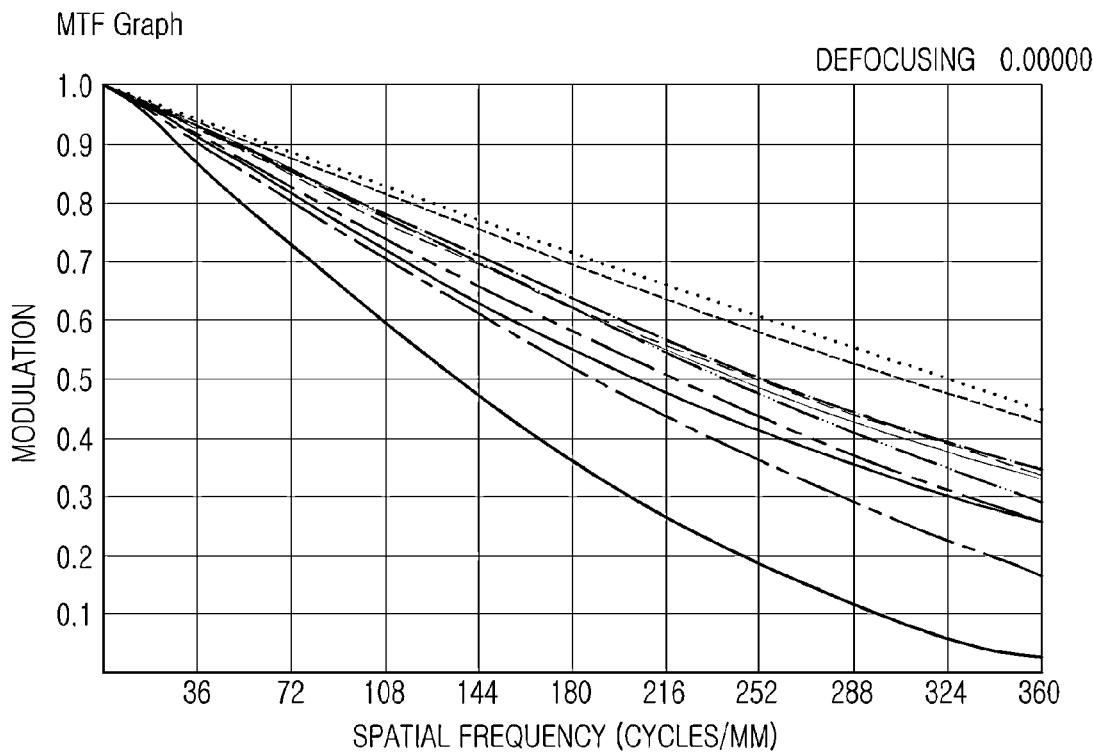
FIG. 11 is a curve showing an MTF of the lens module shown in FIG. 10.
Figure 12:
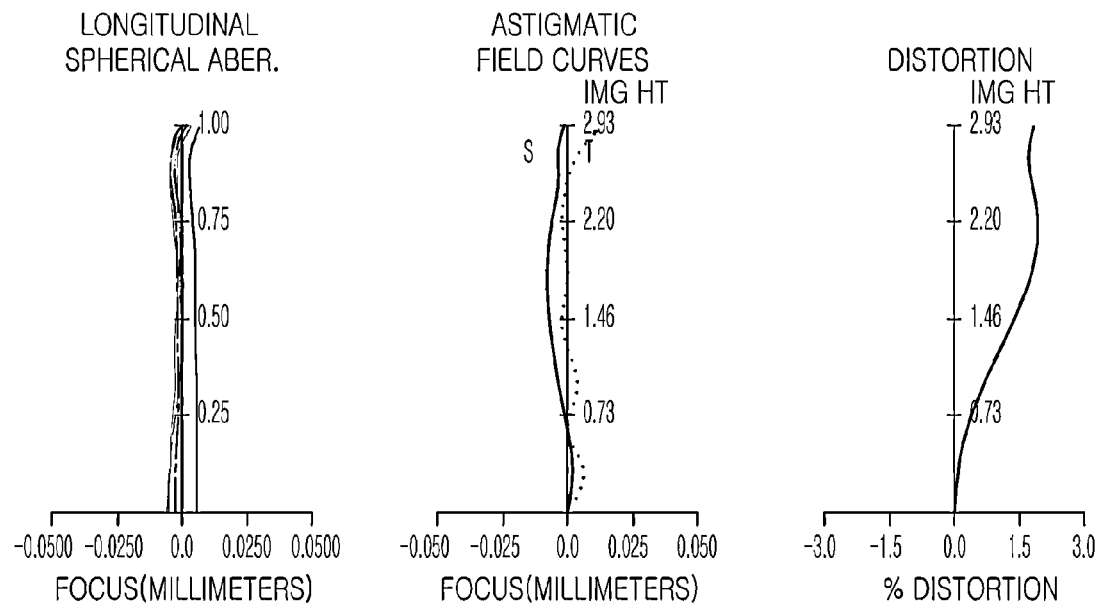
FIG. 12 is a curve showing aberration characteristics of the lens module shown in FIG. 10.
Figure 13:
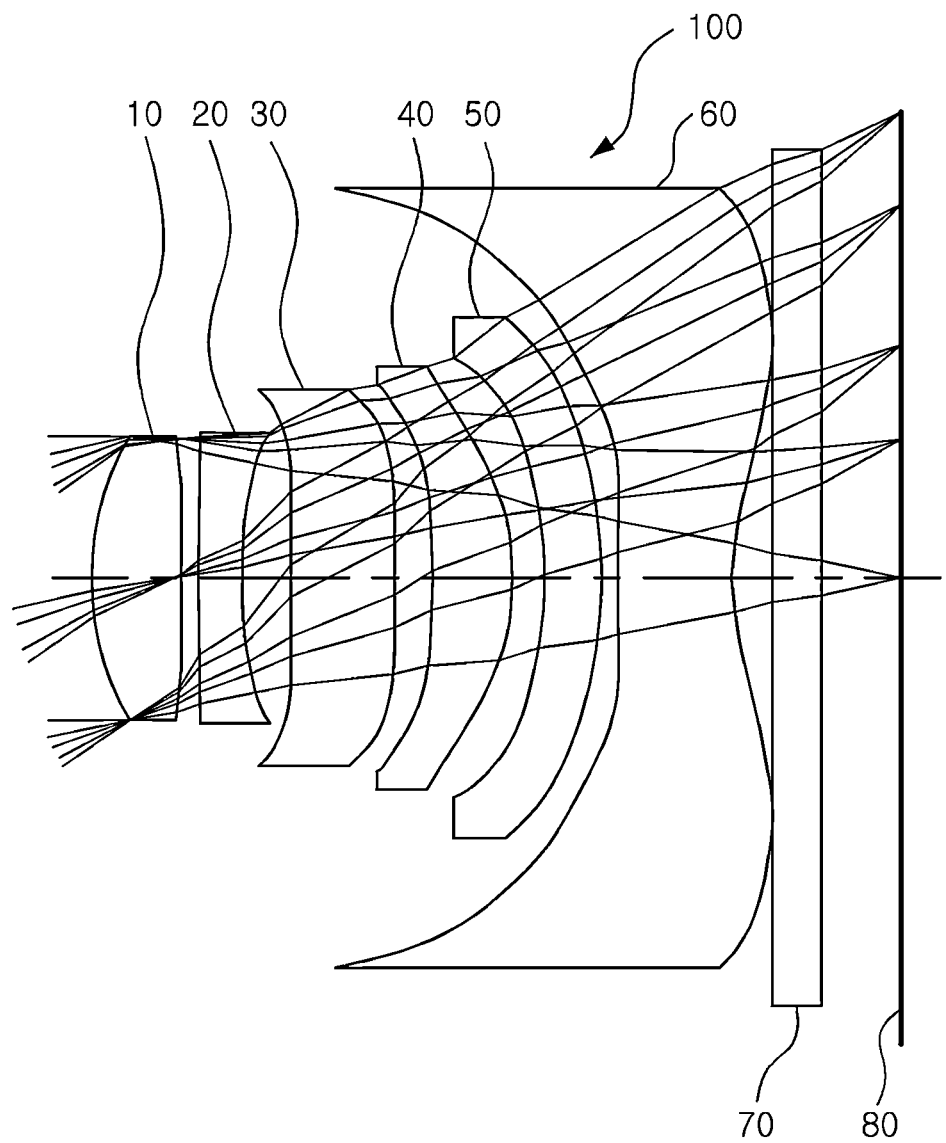
FIG. 13 is a configuration diagram of a lens module according to a fifth exemplary embodiment of the present disclosure.
Figure 14:
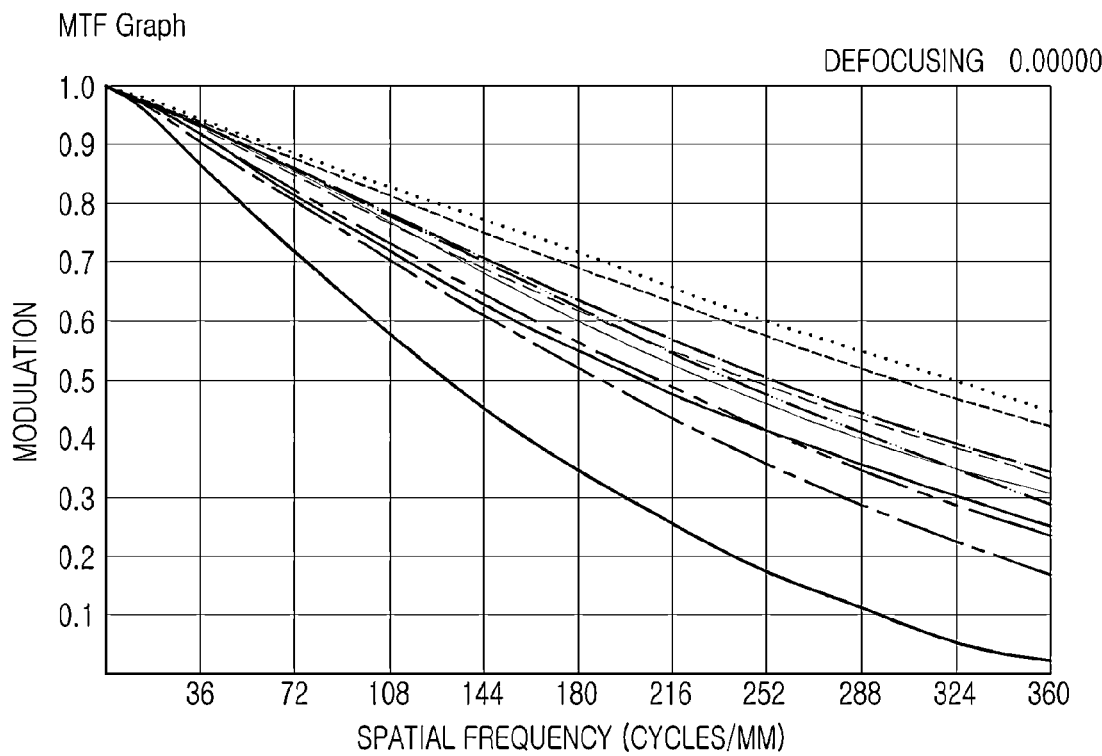
FIG. 14 is a curve showing an MTF of the lens module shown in FIG. 13.
Figure 15:
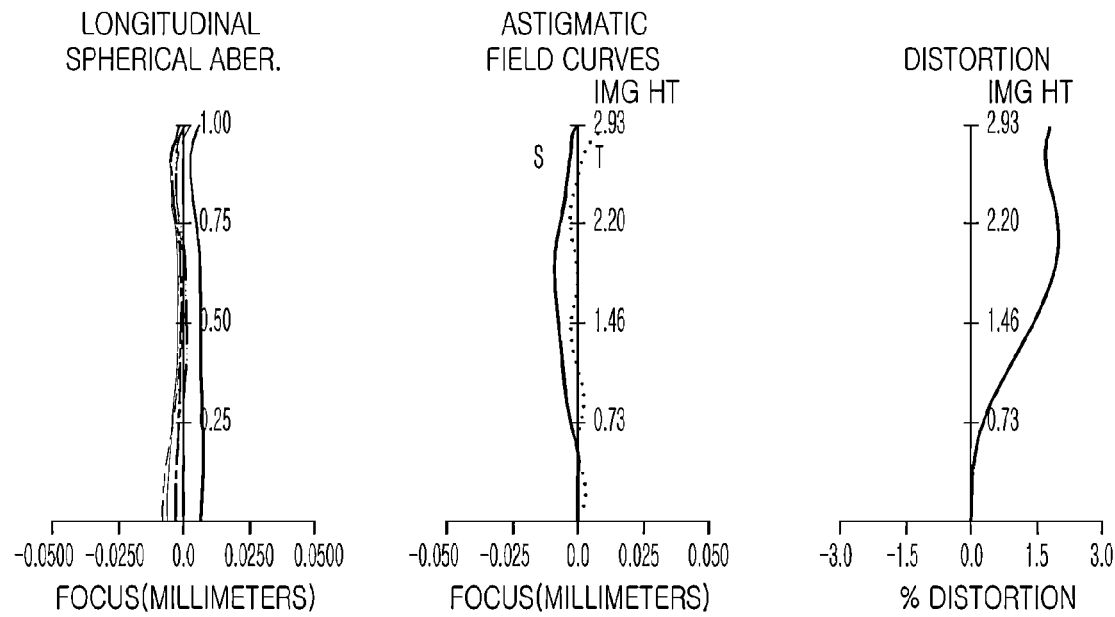
FIG. 15 is a curve showing aberration characteristics of the lens module shown in FIG. 13.
Figure 16:
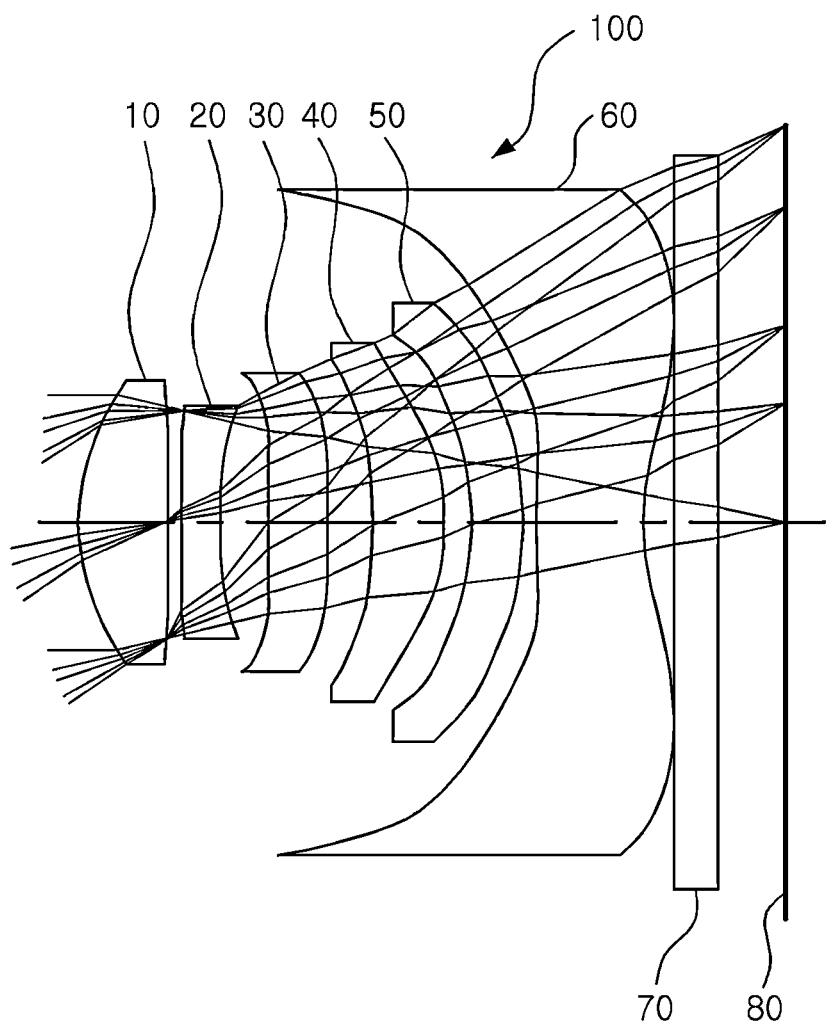
FIG. 16 is a configuration diagram of a lens module according to a sixth exemplary embodiment of the present disclosure.
Figure 17:
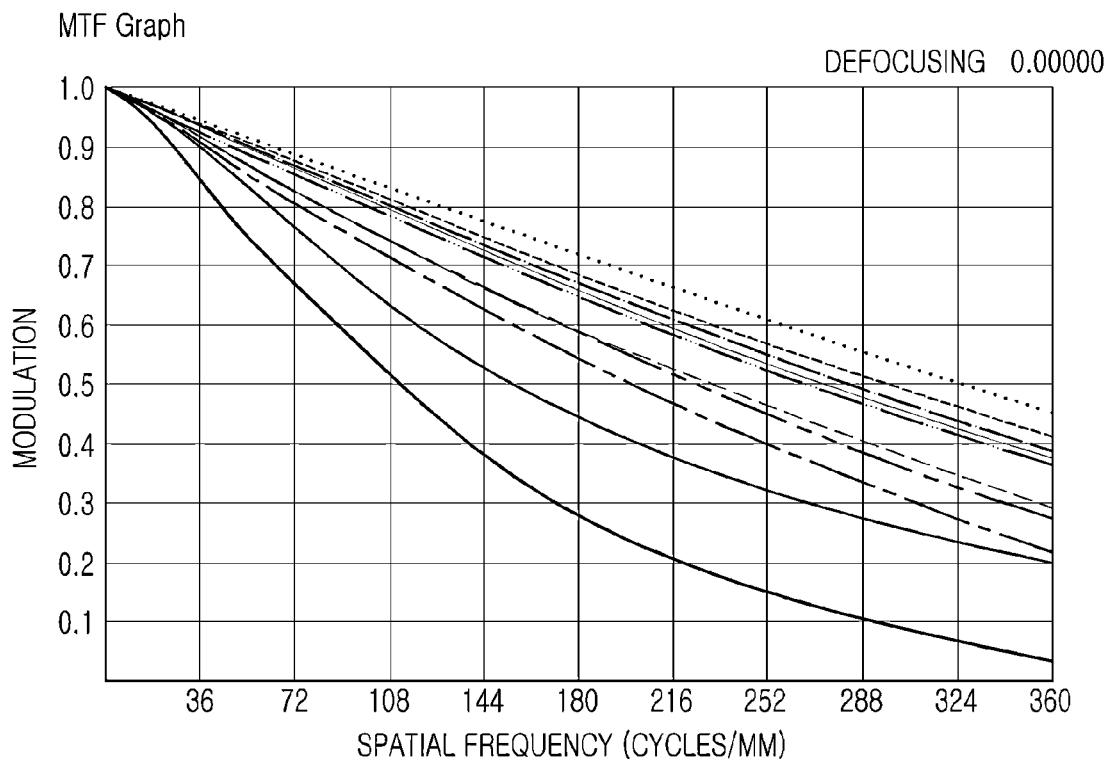
FIG. 17 is a curve showing an MTF of the lens module shown in FIG. 16.
Figure 18:
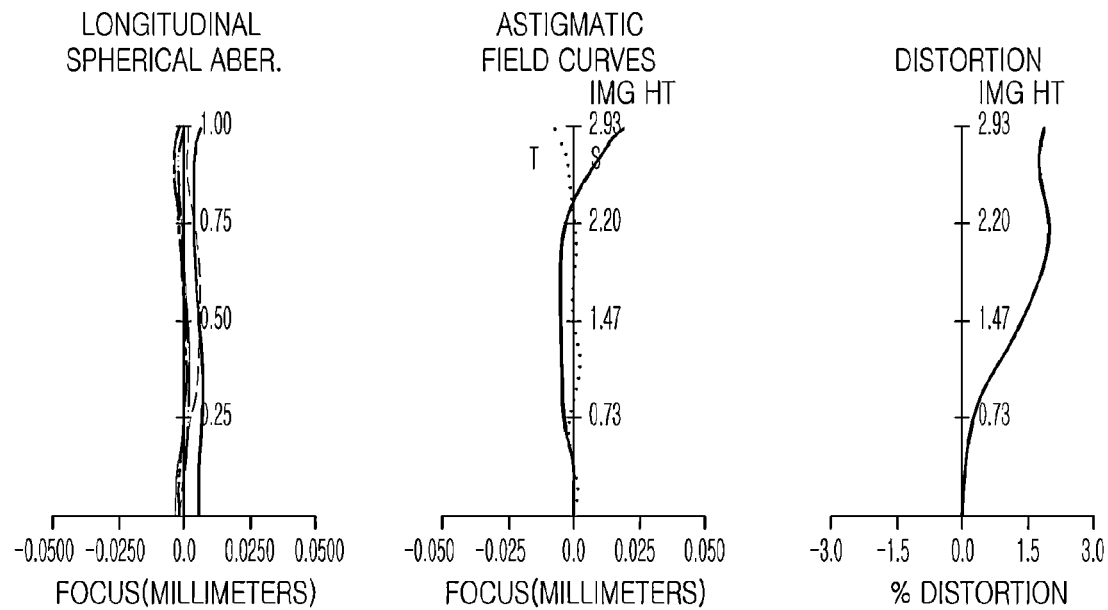
FIG. 18 is a curve showing aberration characteristics of the lens module shown in FIG. 16.
Figure 19:
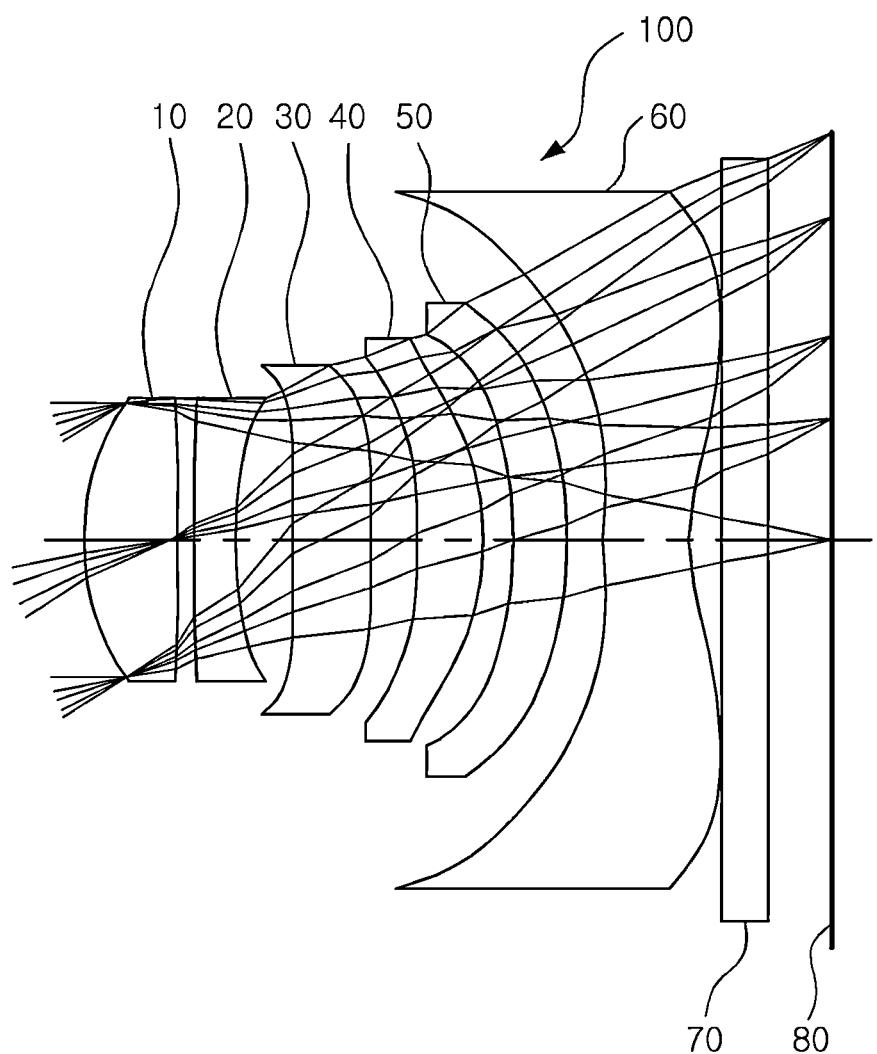
FIG. 19 is a configuration diagram of a lens module according to a seventh exemplary embodiment of the present disclosure.
Figure 20:
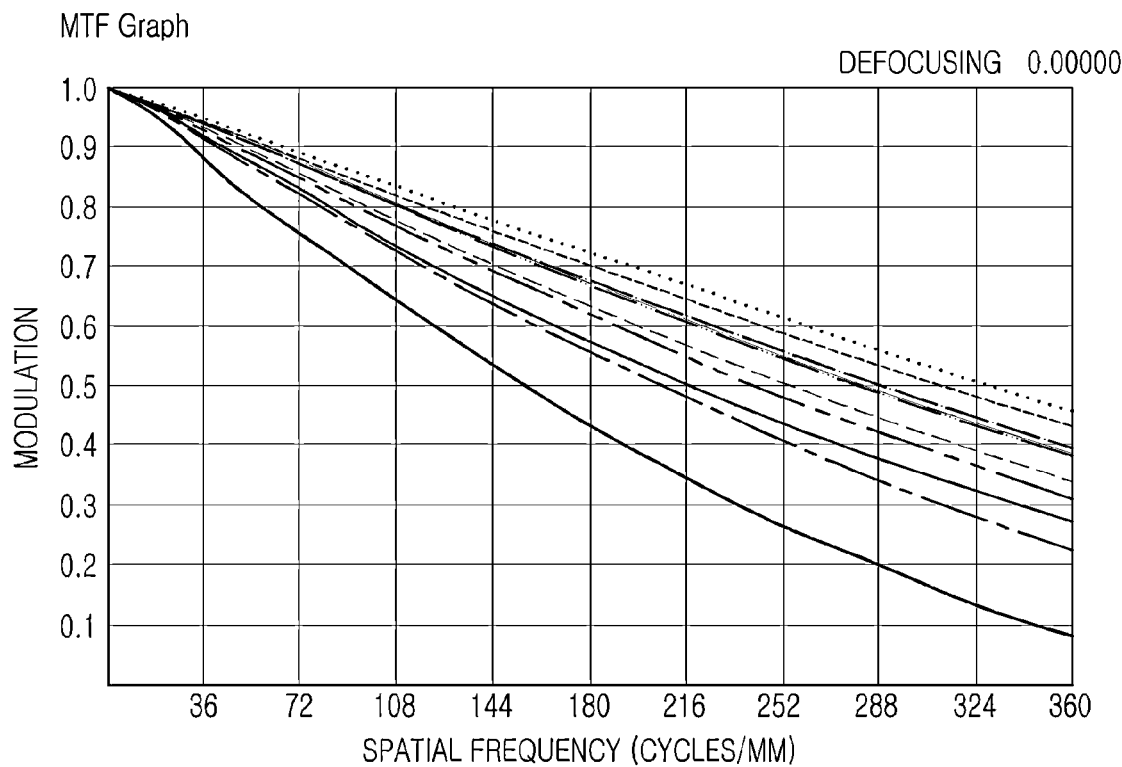
FIG. 20 is a curve showing an MTF of the lens module shown in FIG. 19.
Figure 21:
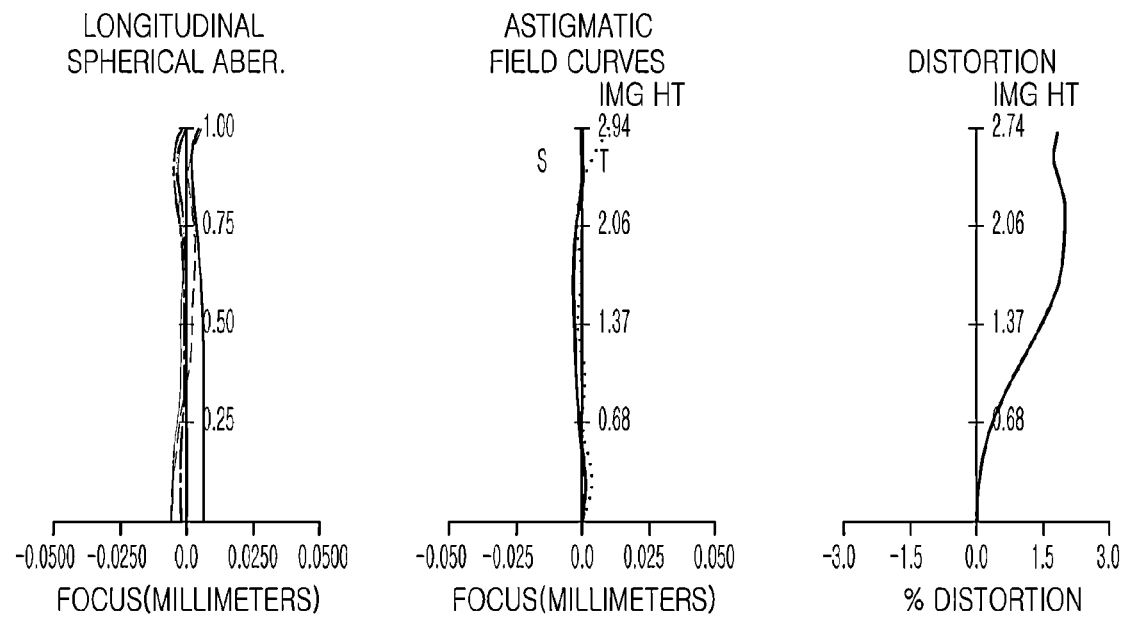
FIG. 21 is a curve showing coma aberration characteristics of the lens module shown in FIG. 19.
Figure 22:
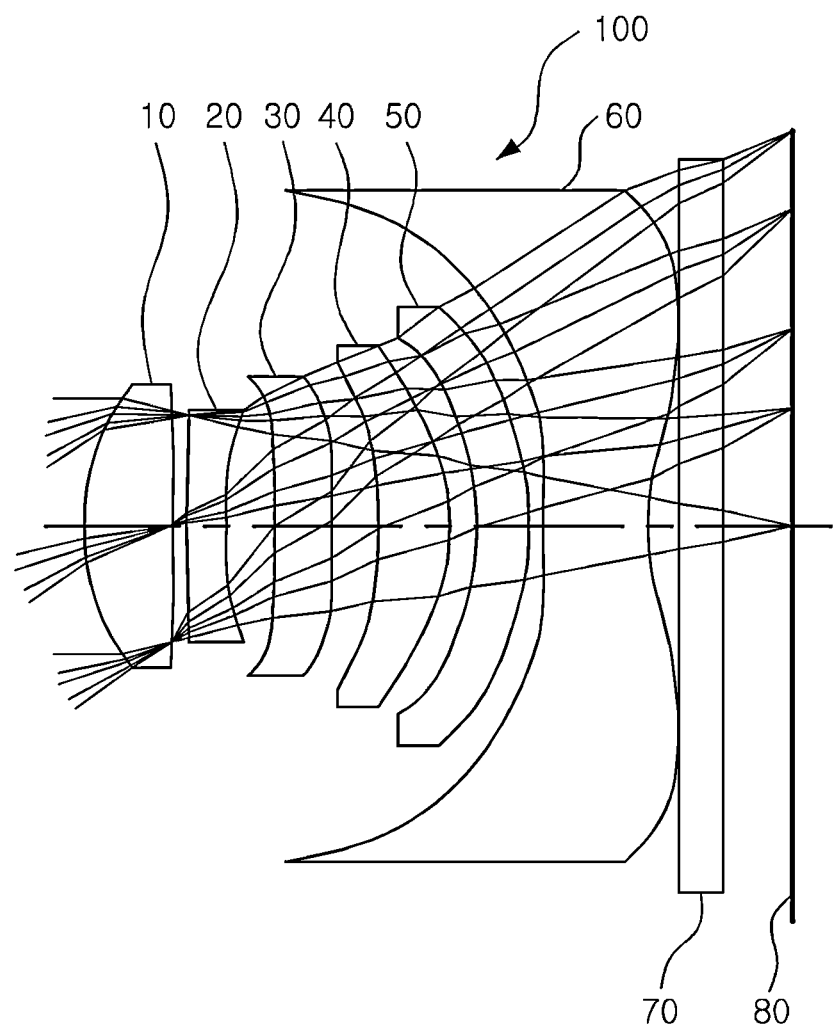
FIG. 22 is a configuration diagram of a lens module according to an eighth exemplary embodiment of the present disclosure.
Figure 23:
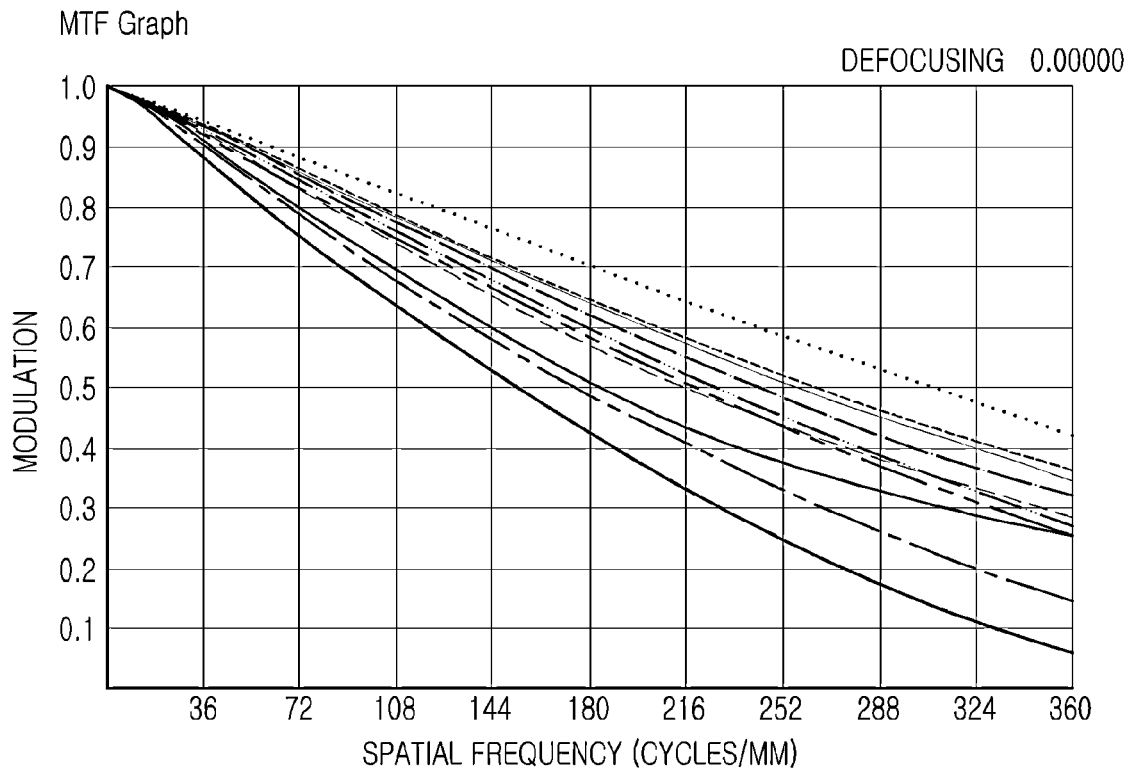
FIG. 23 is a curve showing an MTF of the lens module shown in FIG. 22.
Figure 24:
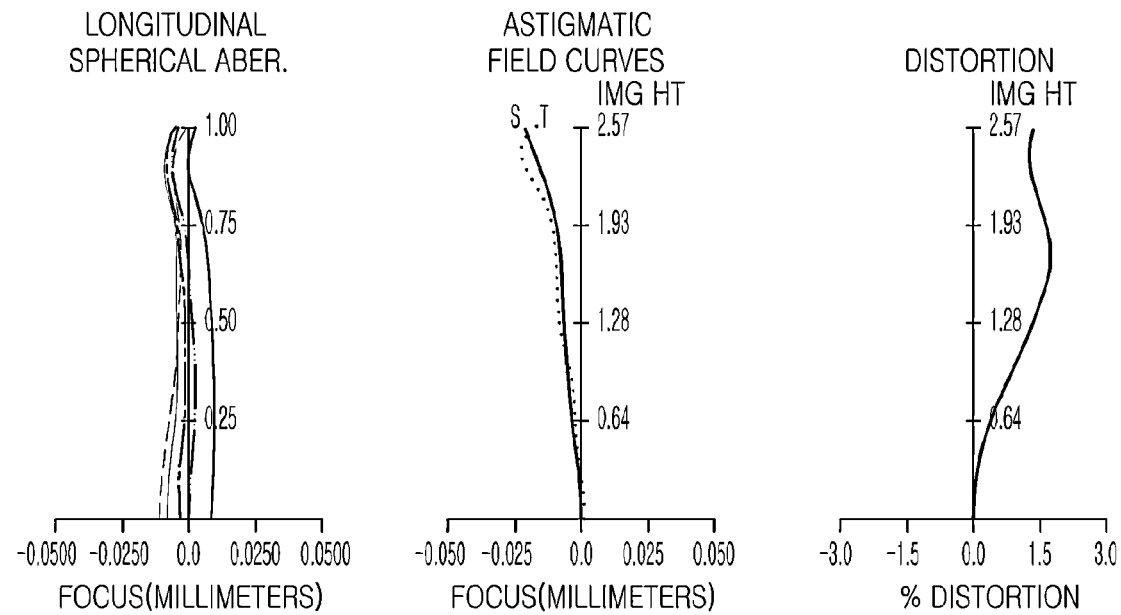
FIG. 24 is a curve showing coma aberration characteristics of the lens module shown in FIG. 22.

FIG. 1 is a configuration diagram of a lens module according to a first exemplary embodiment of the present disclosure; FIG. 2 is a curve showing a modulation transfer function (MTF) of the lens module shown in FIG. 1; FIG. 3 is a curve showing aberration characteristics of the lens module shown in FIG. 1; FIG. 4 is a configuration diagram of a lens module according to a second exemplary embodiment of the present disclosure; FIG. 5 is a curve showing an MTF of the lens module shown in FIG. 4; FIG. 6 is a curve showing aberration characteristics of the lens module shown in FIG. 4; FIG. 7 is a configuration diagram of a lens module according to a third exemplary embodiment of the present disclosure; FIG. 8 is a curve showing an MTF of the lens module shown in FIG. 7; FIG. 9 is a curve showing aberration characteristics of the lens module shown in FIG. 7; FIG. 10 is a configuration diagram of a lens module according to a fourth exemplary embodiment of the present disclosure; FIG. 11 is a curve showing an MTF of the lens module shown in FIG. 10; FIG. 12 is a curve showing aberration characteristics of the lens module shown in FIG. 10; FIG. 13 is a configuration diagram of a lens module according to a fifth exemplary embodiment of the present disclosure; FIG. 14 is a curve showing an MTF of the lens module shown in FIG. 13; FIG. 15 is a curve showing aberration characteristics of the lens module shown in FIG. 13; FIG. 16 is a configuration diagram of a lens module according to a sixth exemplary embodiment of the present disclosure; FIG. 17 is a curve showing an MTF of the lens module shown in FIG. 16; FIG. 18 is a curve showing aberration characteristics of the lens module shown in FIG. 16; FIG. 19 is a configuration diagram of a lens module according to a seventh exemplary embodiment of the present disclosure; FIG. 20 is a curve showing an MTF of the lens module shown in FIG. 19; FIG. 21 is a curve showing coma aberration characteristics of the lens module shown in FIG. 19; FIG. 22 is a configuration diagram of a lens module according to an eighth exemplary embodiment of the present disclosure; FIG. 23 is a curve showing an MTF of the lens module shown in FIG. 22; and FIG. 24 is a curve showing coma aberration characteristics of the lens module shown in FIG. 22.

A lens module according to an exemplary embodiment of the present disclosure may include an optical system including six lenses. More specifically, the lens module may include a first lens, a second lens, a third lens, a fourth lens, a fifth lens, and a sixth lens. However, the lens module is not limited to including only six lenses, but may further include other components if necessary. For example, the lens module may include a stop for controlling an amount of light. In addition, the lens module may further include an infrared cut-off filter for cutting off an infrared ray. Further, the lens module may further include an image sensor (that is, imaging device) for converting an image of a subject incident through an optical system into an electrical signal. Further, the lens module may further include an interval maintaining member for adjusting an interval between lenses.

At least one of the first to sixth lenses may be formed of plastic. For example, the first and sixth lenses may be formed of plastic, and lenses other than the first and sixth lenses may be formed of materials other than plastic. However, all of the first to sixth lenses are not limited to being formed of the materials according to the above-mentioned example, but may be formed of plastic if necessary.

At least one of an object-side surface and an image-side surface of at least one of the first to sixth lenses may be an aspherical surface. For example, the object-side surface or the image-side surface of the first to sixth lenses may be the aspherical surface or both surfaces (object-side surface and image-side surface) of the first to sixth lenses may be aspherical surfaces.

The lens module according to the exemplary embodiment of the present disclosure may satisfy the following Conditional Equation 1.

$$TTL/f < 1.3 \quad \text{[Conditional Equation 1]}$$

In Conditional Equation 1, TTL may indicate a distance [mm] from an object-side surface of the first lens to an image surface, and f may indicate a focal length [mm] of the overall optical system.

Conditional Equation 1 may be a condition for optimizing miniaturization of the lens module. More specifically, in a lens module that does not satisfy a numerical condition of Conditional Equation 1, the entire length of the optical system may be large, such that it is difficult for the lens module to be miniaturized.

The lens module according to the exemplary embodiment of the present disclosure may satisfy the following Conditional Equation 2.

$$|V2-V3| < 33 \quad \text{[Conditional Equation 2]}$$

In Conditional Equation 2, V2 may indicate the Abbe number of the second lens, and V3 may indicate the Abbe number of the third lens.

Conditional Equation 2 may be a condition for optimizing chromatic aberration improvement of the lens module. More specifically, a lens module that does not satisfy a numerical condition of Conditional Equation 2 may have large chromatic aberration, such that it is difficult to implement high resolution image. Further, in the lens module that does not satisfy the numerical condition of Conditional Equation 2, since a distance between the lenses needs to be increased in order to improve chromatic aberrations, it may be difficult to decrease a distance of the optical system (that is, a distance from the object-side surface of the first lens to the image surface thereof).

The lens module according to the exemplary embodiment of the present disclosure may satisfy the following Conditional Equation 3.

$$|Nd4-Nd5| < 0.1 \quad \text{[Conditional Equation 3]}$$

In Conditional Equation 3, Nd4 may indicate a refractive index of the fourth lens, and Nd5 may indicate a refractive index of the fifth lens.

Conditional Equation 3 may be a condition for optimizing a difference in refractive indices between the fourth and fifth lenses. More specifically, a lens module satisfying a numeral condition of Conditional Equation 3 may implement high resolution.

The lens module according to the exemplary embodiment of the present disclosure may satisfy the following Conditional Equation 4.

$$|f3/f|<60 \qquad \text{[Conditional Equation 4]}$$

In Conditional Equation 4, f3 may indicate a focal length [mm] of the third lens, and f may indicate a focal length [mm] of the overall optical system.

Conditional Equation 4 may be a condition for optimizing correction of spherical aberrations. More specifically, a lens module satisfying Conditional Equation 4 may easily correct spherical aberrations through the third lens and may be advantageous to implement high resolution.

The lens module according to the exemplary embodiment of the present disclosure may satisfy the following Conditional Equation 5.

$$|r9/f5|<0.2 \qquad \text{[Conditional Equation 5]}$$

In Conditional Equation 5, r9 may indicate a radius of curvature [mm] of an object-side surface of the fifth lens, and f5 may indicate a focal length [mm] of the fifth lens.

Conditional Equation 5 may be a condition for optimizing manufacturing of the fifth lens. More specifically, the fifth lens that does not satisfy a numeral condition of Conditional Equation 5 may have an excessive large refractive index, such that it is difficult to design the overall optical system and may have increased sensitivity, such that it is difficult to substantially manufacture the fifth lens. That is, since the fifth lens satisfying Conditional Equation 5 has low sensitivity, it may be easily manufactured using plastic.

The lens module according to the exemplary embodiment of the present disclosure may satisfy the following Conditional Equation 6.

$$|(r5+r6)/(r5-r6)|<16 \qquad \text{[Conditional Equation 6]}$$

In Conditional Equation 6, r5 may indicate a radius of curvature [mm] of an object-side surface of the third lens, and r6 may indicate a radius of curvature [mm] of an image-side surface of the third lens.

Conditional Equation 6 may be a condition for optimizing aberration correction by the third lens. More specifically, since the third lens satisfying Conditional Equation 6 may easily correct aberrations, it may be advantageous to implement high resolution.

The lens module according to the exemplary embodiment of the present disclosure may satisfy the following Conditional Equation 7.

$$|r3/f2|<2.6 \qquad \text{[Conditional Equation 7]}$$

In Conditional Equation 7, r3 may indicate a radius of curvature [mm] of an object-side surface of the second lens, and f2 may indicate a focal length [mm] of the second lens.

Conditional Equation 7 may be a condition for optimizing manufacturing of the second lens. More specifically, the second lens that does not satisfy a numeral condition of Conditional Equation 7 may have an excessive large refractive power, such that it is difficult to design the overall optical system, and may have increased sensitivity, such that it is difficult to substantially manufacture the second lens. That is, since the second lens satisfying Conditional Equation 7 has low sensitivity, it may be easily manufactured using plastic.

The lens module according to the exemplary embodiment of the present disclosure may satisfy the following Conditional Equation 8.

$$f3/f4>3.0 \qquad \text{[Conditional Equation 8]}$$

In Conditional Equation 8, f3 may indicate a focal length [mm] of the third lens, and f4 may indicate a focal length [mm] of the fourth lens.

Conditional Equation 8 may be an optimization condition for setting each of the refractive powers of the third and fourth lenses to a positive value.

The lens module according to the exemplary embodiment of the present disclosure may satisfy the following Conditional Equation 9.

$$V6-V5>30 \qquad \text{[Conditional Equation 9]}$$

In Conditional Equation 9, V5 may indicate the Abbe number of the fifth lens, and V6 may indicate the Abbe number of the sixth lens.

Conditional Equation 9 may be a condition for optimizing a chromatic aberration improving effect by the fifth lens.

Next, the first to sixth lenses of the lens module according to the exemplary embodiment of the present disclosure will be described.

The first lens may have positive refractive power. However, a refractive power of the first lens is not limited to the positive refractive power. For example, the first lens may have negative refractive power if necessary. The first lens may be formed of plastic. However, a material of the first lens is not limited to plastic. For example, a material of the first lens may be substituted with any other material capable transmitting light. The first lens may have a shape in which a first surface thereof is convex and a second surface is concave. For example, the first lens may have a meniscus shape in which it is convex toward an object or a plano-convex shape in which one surface thereof is convex. At least one of the first and second surfaces of the first lens may be an aspherical surface. For example, the first surface or the second surface of the first lens or both of the first and second surfaces of the first lens may be the aspherical surface.

The second lens may have negative refractive power. The second lens may be formed of plastic. However, a material of the second lens is not limited to plastic. For example, a material of the second lens may be substituted with any other material capable of transmitting light. The second lens may have a shape in which a first surface thereof is convex and a second surface is concave. For example, the second lens may have a meniscus shape in which it is convex toward the object. At least one of the first and second surfaces of the second lens may be an aspherical surface. For example, the first surface or the second surface of the second lens or both of the first and second surfaces of the second lens may be the aspherical surface.

The third lens may have positive refractive power. The third lens may be formed of plastic. However, a material of the third lens is not limited to plastic. For example, a material of the third lens may be substituted with any other material capable of transmitting light. The third lens may have a shape in which first and second surfaces thereof are convex or concave. That is, a shape of the third lens may not be particularly limited. At least one of the first and second surfaces of the third lens may be an aspherical surface. For example, the first surface or the second surface of the third lens or both of the first and second surfaces of the third lens may be the aspherical surface.

The fourth lens may have positive refractive power. The fourth lens may be formed of plastic. However, a material of the fourth lens is not limited to plastic. For example, a material of the fourth lens may be substituted with any other material capable of transmitting light. The fourth lens may have a shape in which a first surface thereof is concave and a second surface is convex. For example, the fourth lens may have a meniscus shape in which it is convex toward the image. At least one of the first and second surfaces of the fourth lens may be an aspherical surface. For example, the first surface or the second surface of the fourth lens or both of the first and second surfaces of the fourth lens may be the aspherical surface.

The fifth lens may have negative refractive power. The fifth lens may be formed of plastic. However, a material of the fifth lens is not limited to plastic. For example, a material of the fifth lens may be substituted with any other material capable of transmitting light. The fifth lens may have a shape in which a first surface thereof is concave and a second surface is convex. For example, the fifth lens may have a meniscus shape in which it is convex toward the image. At least one of the first and second surfaces of the fifth lens may be an aspherical surface. For example, the first surface or the second surface of the fifth lens or both of the first and second surfaces of the fifth lens may be the aspherical surface.

The sixth lens may have a positive or negative refractive power. That is, a reflective index of the sixth lens may not be limited to a positive or negative refractive power. The sixth lens may be formed of plastic. However, a material of the sixth lens is not limited to plastic. For example, a material of the sixth lens may be substituted with any other material capable of transmitting light. The sixth lens may have a shape in which a first surface thereof is convex and a second surface is concave. The sixth lens may have a point of inflection formed on at least one of the first and second surfaces thereof. For example, the second surface of the sixth lens may have a shape in which it is concave at the center of an optical axis and becomes convex toward an edge thereof. At least one or both of the first and second surfaces of the sixth lens may be an aspherical surface.

Meanwhile, effective apertures (that is, sizes of portions substantially refracting light) of the lenses may become gradually larger from the second lens toward the sixth lens. However, an effective aperture of the first lens may be larger than that of the second lens. However, the effective aperture of the first lens is not necessarily larger than that of the second lens, but may be equal to or smaller than that of the second lens if necessary.

The lens module configured as described above may significantly decrease aberrations causing image quality deterioration, and improve resolution. In addition, the lens module configured as described above may be easy for lightness and be advantageous for decreasing a manufacturing cost.

Next, lens modules according to first to eighth exemplary embodiments of the present disclosure will be described.

First, a lens module according to a first exemplary embodiment of the present disclosure will be described with reference to FIGS. 1 through 3.

The lens module 100 according to the first exemplary embodiment of the present disclosure may include a first lens 10, a second lens 20, a third lens 30, a fourth lens 40, a fifth lens 50, and a sixth lens 60. Further, the lens module 100 may further include an infrared cut-off filter 70 and an image sensor 80. In addition, the lens module 100 may further include at least one stop (not shown in FIG. 1). For reference, the overall focal length f of the lens module may be 4.22 [mm].

The following Table 1 may show radii of curvature of lenses, thicknesses of the lenses or distances between the lenses, refractive indices of the lenses, and the Abbe numbers thereof. More specifically, values of a horizontal axis corresponding to Surface No. 1 of a vertical axis may sequentially indicate a radius of curvature of a first surface of the first lens 10, a thickness of the first lens 10, a refractive index of the first lens 10, and the Abbe number of the first lens 10. In addition, values on the horizontal axis corresponding to Surface No. 2 of the vertical axis may sequentially indicate a radius of curvature of a second surface of the first lens 10 and a distance between the first and second lenses 10 and 20. Similar, values on the horizontal axis corresponding to Surface No. 3 of the vertical axis may sequentially indicate a radius of curvature of a first surface of the second lens 20, a thickness of the second lens 20, a refractive index of the second lens 20, and the Abbe number of the second lens 20. In addition, values on the horizontal axis corresponding to Surface No. 4 of the vertical axis may sequentially indicate a radius of curvature of a second surface of the second lens 20 and a distance between the second and third lenses 20 and 30.

Table 2 shows aspherical constants of the respective lenses. More specifically, a horizontal axis in Table 2 may indicate first and second surfaces of the lenses. For example, No. 1 on the horizontal axis may indicate the first surface of the first lens 10, and No. 2 on the horizontal axis may indicate the second surface of the first lens 10. In addition, No. 3 on the horizontal axis may indicate the first surface of the second lens 20, and No. 4 on the horizontal axis may indicate the second surface of the second lens 20. In a similar scheme, Nos. 5 to 12 on the horizontal axis may indicate first and second surfaces of the third to sixth lenses, respectively.

In the present exemplary embodiment, the first lens 10 may have positive refractive power. In addition, the first lens 10 may have a shape in which the first surface thereof is convex and the second surface is concave. The second lens 20 may have negative refractive power. In addition, the second lens 20 may have a shape in which the first surface thereof is convex and the second surface is concave. The third lens 30 may have positive refractive power. In addition, the third lens 30 may have a shape in which the first surface thereof is convex and the second surface is concave. The fourth lens 40 may have positive refractive power. In addition, the fourth lens 40 may have a shape in which the first surface thereof is concave and the second surface is convex. That is, the fourth lens 40 may have a meniscus shape in which it is convex toward the image. The fifth lens 50 may have negative refractive power. In addition, the fifth lens 50 may have a shape in which the first surface thereof is concave and the second surface is convex. That is, the fifth lens 50 may have a meniscus shape in which it is convex toward the image. The sixth lens 60 may have negative refractive power. In addition, the sixth lens 60 may have a shape in which the first surface thereof is convex and the second surface is concave. Further, the sixth lens 60 may have a point of inflection formed on the second surface thereof.

The lens module configured as described above may have modulation transfer function (MTF) characteristics and aberration characteristics as shown in FIGS. 2 and 3.

TABLE 1

| Surface No. | Radius of curvature | Thickness or distance | Refractive index | Abbe number |
|---|---|---|---|---|
| Object | Infinity | Infinity | | |
| 1 | 1.603 | 0.57 | 1.544 | 56.1 |
| 2 | 60.525 | 0.1 | | |
| 3 | 4.807 | 0.265 | 1.632 | 23.4 |
| 4 | 1.994 | 0.323 | | |
| 5 | 18.184 | 0.564 | 1.544 | 56.1 |

TABLE 1-continued

| Surface No. | Radius of curvature | Thickness or distance | Refractive index | Abbe number |
|---|---|---|---|---|
| 6 | 20.765 | 0.126 | | |
| 7 | −14.116 | 0.467 | 1.576 | 55.1 |
| 8 | −1.82 | 0.2 | | |
| 9 | −1.189 | 0.403 | 1.635 | 24 |
| 10 | −1.491 | 0.219 | | |
| 11 | 23.128 | 0.938 | 1.544 | 56.1 |
| 12 | 1.826 | 0.18 | | |
| 13 | Infinity | 0.3 | 1.517 | 64.2 |
| 14 | Infinity | 0.498 | | |
| Image | Infinity | 0.004 | | | positive refractive power. In addition, the fourth lens 40 may have a shape in which the first surface thereof is concave and the second surface is convex. That is, the fourth lens 40 may have a meniscus shape in which it is convex toward the image. The fifth lens 50 may have negative refractive power. In addition, the fifth lens 50 may have a shape in which the first surface thereof is concave and the second surface is convex. That is, the fifth lens 50 may have a meniscus shape in which it is convex toward the image. The sixth lens 60 may have negative refractive power. In addition, the sixth lens 60 may have a shape in which the first surface thereof is convex and the second surface is concave. Further, the sixth lens 60 may have a point of inflection formed on the second surface thereof.

TABLE 2

| Example 1 | 1 | 2 | 3 | 4 | 5 | 6 | 7 | 8 | 9 | 10 | 11 | 12 |
|---|---|---|---|---|---|---|---|---|---|---|---|---|
| Y radius | 1.509 | 17.951 | 9.496 | 2.532 | 10.419 | 644.097 | −6.605 | −1.992 | −1.371 | −1.513 | 7.771 | 1.422 |
| Conic Constant (K) | 0.098 | 0.000 | 0.000 | −0.888 | −6.264 | 1.931 | 0.000 | 0.000 | −6.225 | −5.178 | −376.474 | −8.834 |
| 4-th order coefficient (A) | −0.004 | −0.116 | −0.216 | −0.137 | −0.138 | −0.127 | −0.134 | 0.005 | 0.015 | 0.006 | −0.205 | −0.068 |
| 6-th order coefficient (B) | 0.002 | 0.295 | 0.597 | 0.466 | 0.093 | −0.010 | 0.040 | 0.003 | −0.044 | −0.029 | 0.089 | 0.023 |
| 8-th order coefficient (C) | 0.013 | −0.415 | −0.800 | −0.519 | −0.071 | 0.016 | −0.168 | −0.068 | −0.014 | 0.012 | −0.022 | −0.006 |
| 10-th order coefficient (D) | −0.065 | 0.323 | 0.572 | 0.325 | −0.001 | −0.030 | 0.283 | 0.128 | 0.048 | 0.003 | 0.003 | 0.001 |
| 12-th order coefficient (E) | 0.100 | −0.137 | −0.189 | −0.051 | 0.000 | 0.000 | −0.177 | −0.067 | −0.042 | −0.006 | 0.000 | 0.000 |
| 14-th order coefficient (F) | −0.060 | 0.000 | 0.000 | 0.000 | 0.000 | 0.000 | 0.031 | 0.010 | 0.010 | 0.002 | 0.000 | 0.000 |

A lens module according to a second exemplary embodiment of the present disclosure will be described with reference to FIGS. 4 through 6.

The lens module 100 according to the second exemplary embodiment of the present disclosure may include a first lens 10, a second lens 20, a third lens 30, a fourth lens 40, a fifth lens 50, and a sixth lens 60. Further, the lens module 100 may further include an infrared cut-off filter 70 and an image sensor 80. In addition, the lens module 100 may further include at least one stop (not shown in FIG. 4). For reference, the overall focal length f of the lens module may be 4.14 [mm].

The following Table 3 may show radii of curvature of lenses, thicknesses of the lenses or distances between the lenses, refractive indices of the lenses, and the Abbe numbers thereof. In addition, Table 4 shows aspherical constants of the respective lenses.

In the present exemplary embodiment, the first lens 10 may have positive refractive power. In addition, the first lens 10 may have a shape in which the first surface thereof is convex and the second surface is concave. The second lens 20 may have negative refractive power. In addition, the second lens 20 may have a shape in which the first surface thereof is convex and the second surface is concave. The third lens 30 may have positive refractive power. In addition, the third lens 30 may have a shape in which the first surface thereof is convex and the second surface is concave. The fourth lens 40 may have The lens module configured as described above may have modulation transfer function (MTF) characteristics and aberration characteristics as shown in FIGS. 5 and 6.

TABLE 3

| Surface No. | Radius of curvature | Thickness or distance | Refractive index | Abbe number |
|---|---|---|---|---|
| Object | Infinity | Infinity | | |
| 1 | 1.509 | 0.59 | 1.544 | 56.1 |
| 2 | 17.951 | 0.1 | | |
| 3 | 9.496 | 0.265 | 1.632 | 23.4 |
| 4 | 2.532 | 0.276 | | |
| 5 | 10.419 | 0.534 | 1.544 | 56.1 |
| 6 | 644.097 | 0.246 | | |
| 7 | −6.605 | 0.394 | 1.544 | 56.1 |
| 8 | −1.992 | 0.2 | | |
| 9 | −1.371 | 0.36 | 1.635 | 24 |
| 10 | −1.513 | 0.191 | | |
| 11 | 7.771 | 0.725 | 1.544 | 56.1 |
| 12 | 1.422 | 0.198 | | |
| 13 | Infinity | 0.3 | 1.517 | 64.2 |
| 14 | Infinity | 0.516 | | |
| Image | Infinity | 0.007 | | |

TABLE 4

| Example 1 | 1 | 2 | 3 | 4 | 5 | 6 | 7 | 8 | 9 | 10 | 11 | 12 |
|---|---|---|---|---|---|---|---|---|---|---|---|---|
| Y radius | 1.563 | 22.683 | 12.629 | 2.826 | 9.536 | 644.097 | −4.635 | −1.561 | −1.329 | −1.479 | 7.168 | 1.259 |
| Conic Constant (K) | 0.062 | 0.000 | 0.000 | −1.005 | −6.264 | 1.931 | 0.000 | 0.000 | −7.444 | −7.356 | −376.474 | −8.539 |

TABLE 4-continued

| Example 1 | 1 | 2 | 3 | 4 | 5 | 6 | 7 | 8 | 9 | 10 | 11 | 12 |
|---|---|---|---|---|---|---|---|---|---|---|---|---|
| 4-th order coefficient (A) | −0.004 | −0.122 | −0.211 | −0.138 | −0.145 | −0.123 | −0.113 | 0.055 | 0.000 | −0.005 | −0.205 | −0.068 |
| 6-th order coefficient (B) | −0.003 | 0.294 | 0.600 | 0.468 | 0.077 | −0.022 | 0.037 | −0.010 | −0.042 | −0.037 | 0.089 | 0.024 |
| 8-th order coefficient (C) | 0.014 | −0.418 | −0.791 | −0.533 | −0.042 | 0.029 | −0.165 | −0.068 | −0.024 | 0.014 | −0.022 | −0.006 |
| 10-th order coefficient (D) | −0.073 | 0.304 | 0.546 | 0.353 | −0.018 | −0.034 | 0.272 | 0.129 | 0.052 | 0.005 | 0.003 | 0.001 |
| 12-th order coefficient (E) | 0.105 | −0.124 | −0.167 | −0.078 | 0.000 | 0.000 | −0.177 | −0.067 | −0.035 | −0.006 | 0.000 | 0.000 |
| 14-th order coefficient (F) | −0.069 | 0.000 | 0.000 | 0.000 | 0.000 | 0.000 | 0.036 | 0.011 | 0.007 | 0.001 | 0.000 | 0.000 |

A lens module according to a third exemplary embodiment of the present disclosure will be described with reference to FIGS. 7 through 9.

The lens module 100 according to the third exemplary embodiment of the present disclosure may include a first lens 10, a second lens 20, a third lens 30, a fourth lens 40, a fifth lens 50, and a sixth lens 60. Further, the lens module 100 may further include an infrared cut-off filter 70 and an image sensor 80. In addition, the lens module 100 may further include at least one stop (not shown in FIG. 7). For reference, the overall focal length f of the lens module may be 4.08 [mm].

The following Table 5 may show radii of curvature of lenses, thicknesses of the lenses or distances between the lenses, refractive indices of the lenses, and the Abbe numbers thereof. In addition, Table 6 shows aspherical constants of the respective lenses.

In the present exemplary embodiment, the first lens 10 may have positive refractive power. In addition, the first lens 10 may have a shape in which the first surface thereof is convex and the second surface is concave. The second lens 20 may have negative refractive power. In addition, the second lens 20 may have a shape in which the first surface thereof is convex and the second surface is concave. The third lens 30 may have positive refractive power. In addition, the third lens 30 may have a shape in which the first surface thereof is convex and the second surface is concave. The fourth lens 40 may have positive refractive power. In addition, the fourth lens 40 may have a shape in which the first surface thereof is concave and the second surface is convex. That is, the fourth lens 40 may have a meniscus shape in which it is convex toward the image. The fifth lens 50 may have negative refractive power. In addition, the fifth lens 50 may have a shape in which the first surface thereof is concave and the second surface is convex. That is, the fifth lens 50 may have a meniscus shape in which it is convex toward the image. The sixth lens 60 may have negative refractive power. In addition, the sixth lens 60 may have a shape in which the first surface thereof is convex and the second surface is concave. Further, the sixth lens 60 may have a point of inflection formed on the second surface thereof.

The lens module configured as described above may have modulation transfer function (MTF) characteristics and aberration characteristics as shown in FIGS. 8 and 9.

TABLE 5

| Surface No. | Radius of curvature | Thickness or distance | Refractive index | Abbe number |
|---|---|---|---|---|
| Object | Infinity | Infinity | | |
| 1 | 1.563 | 0.577 | 1.544 | 56.1 |
| 2 | 22.683 | 0.1 | | |
| 3 | 12.629 | 0.265 | 1.632 | 23.4 |
| 4 | 2.826 | 0.292 | | |
| 5 | 9.536 | 0.564 | 1.544 | 56.1 |
| 6 | 644.097 | 0.261 | | |
| 7 | −4.635 | 0.44 | 1.544 | 56.1 |
| 8 | −1.561 | 0.2 | | |
| 9 | −1.329 | 0.36 | 1.635 | 24 |
| 10 | −1.479 | 0.154 | | |
| 11 | 7.168 | 0.646 | 1.544 | 56.1 |
| 12 | 1.259 | 0.221 | | |
| 13 | Infinity | 0.3 | 1.519 | 64.2 |
| 14 | Infinity | 0.523 | | |
| Image | Infinity | 0 | | |

TABLE 6

| Example 1 | 1 | 2 | 3 | 4 | 5 | 6 | 7 | 8 | 9 | 10 | 11 | 12 |
|---|---|---|---|---|---|---|---|---|---|---|---|---|
| Y radius | 1.563 | 22.683 | 12.629 | 2.826 | 9.536 | 644.097 | −4.635 | −1.561 | −1.329 | −1.479 | 7.168 | 1.259 |
| Conic Constant (K) | 0.062 | 0.000 | 0.000 | −1.005 | −6.264 | 1.931 | 0.000 | 0.000 | −7.444 | −7.356 | −376.474 | −8.539 |
| 4-th order coefficient (A) | −0.004 | −0.122 | −0.211 | −0.138 | −0.145 | −0.123 | −0.113 | 0.055 | 0.000 | −0.005 | −0.205 | −0.068 |
| 6-th order coefficient (B) | −0.003 | 0.294 | 0.600 | 0.468 | 0.077 | −0.022 | 0.037 | −0.010 | −0.042 | −0.037 | 0.089 | 0.024 |
| 8-th order coefficient (C) | 0.014 | −0.418 | −0.791 | −0.533 | −0.042 | 0.029 | −0.165 | −0.068 | −0.024 | 0.014 | −0.022 | −0.006 |
| 10-th order coefficient (D) | −0.073 | 0.304 | 0.546 | 0.353 | −0.018 | −0.034 | 0.272 | 0.129 | 0.052 | 0.005 | 0.003 | 0.001 |
| 12-th order coefficient (E) | 0.105 | −0.124 | −0.167 | −0.078 | 0.000 | 0.000 | −0.177 | −0.067 | −0.035 | −0.006 | 0.000 | 0.000 |

TABLE 6-continued

| Example 1 | 1 | 2 | 3 | 4 | 5 | 6 | 7 | 8 | 9 | 10 | 11 | 12 |
|---|---|---|---|---|---|---|---|---|---|---|---|---|
| 14-th order coefficient (F) | −0.069 | 0.000 | 0.000 | 0.000 | 0.000 | 0.000 | 0.036 | 0.011 | 0.007 | 0.001 | 0.000 | 0.000 |

A lens module according to a fourth exemplary embodiment of the present disclosure will be described with reference to FIGS. 10 through 12.

The lens module 100 according to the fourth exemplary embodiment of the present disclosure may include a first lens 10, a second lens 20, a third lens 30, a fourth lens 40, a fifth lens 50, and a sixth lens 60. Further, the lens module 100 may further include an infrared cut-off filter 70 and an image sensor 80. In addition, the lens module 100 may further include at least one stop (not shown in FIG. 10). For reference, the overall focal length f of the lens module may be 4.11 [mm].

The following Table 7 may show radii of curvature of lenses, thicknesses of the lenses or distances between the lenses, refractive indices of the lenses, and the Abbe numbers thereof. In addition, Table 8 shows aspherical constants of the respective lenses.

In the present exemplary embodiment, the first lens 10 may have positive refractive power. In addition, the first lens 10 may have a shape in which the first surface thereof is convex and the second surface is concave. The second lens 20 may have negative refractive power. In addition, the second lens 20 may have a shape in which the first surface thereof is convex and the second surface is concave. The third lens 30 may have positive refractive power. In addition, the third lens 30 may have a shape in which the first surface thereof is convex and the second surface is concave. The fourth lens 40 may have positive refractive power. In addition, the fourth lens 40 may have a shape in which the first surface thereof is concave and the second surface is convex. That is, the fourth lens 40 may have a meniscus shape in which it is convex toward the image. The fifth lens 50 may have negative refractive power. In addition, the fifth lens 50 may have a shape in which the first surface thereof is concave and the second surface is convex. That is, the fifth lens 50 may have a meniscus shape in which it is convex toward the image. The sixth lens 60 may have negative refractive power. In addition, the sixth lens 60 may have a shape in which the first surface thereof is convex and the second surface is concave. Further, the sixth lens 60 may have a point of inflection formed on the second surface thereof.

The lens module configured as described above may have modulation transfer function (MTF) characteristics and aberration characteristics as shown in FIGS. 11 and 12.

TABLE 7

| Surface No. | Radius of curvature | Thickness or distance | Refractive index | Abbe number |
|---|---|---|---|---|
| Object | Infinity | Infinity | | |
| 1 | 1.772 | 0.566 | 1.544 | 56.1 |
| 2 | 4216.24 | 0.1 | | |
| 3 | 8.127 | 0.281 | 1.632 | 23.4 |
| 4 | 2.589 | 0.308 | | |
| 5 | 11.812 | 0.737 | 1.544 | 56.1 |
| 6 | 68.516 | 0.194 | | |
| 7 | −5.268 | 0.546 | 1.544 | 56.1 |
| 8 | −1.532 | 0.212 | | |
| 9 | −2.107 | 0.36 | 1.635 | 24 |
| 10 | −2.433 | 0.1 | | |
| 11 | 6.921 | 0.717 | 1.544 | 56.1 |
| 12 | 1.326 | 0.258 | | |
| 13 | Infinity | 0.318 | 1.519 | 64.2 |
| 14 | Infinity | 0.504 | | |
| Image | Infinity | 0 | | |

TABLE 8

| Example 1 | 1 | 2 | 3 | 4 | 5 | 6 | 7 | 8 | 9 | 10 | 11 | 12 |
|---|---|---|---|---|---|---|---|---|---|---|---|---|
| Y radius | 1.772 | 4216.240 | 8.127 | 2.589 | 11.812 | 68.516 | −5.268 | −1.532 | −2.107 | −2.433 | 6.921 | 1.326 |
| Conic Constant (K) | 0.036 | 0.000 | 0.000 | −1.905 | −6.264 | 1.931 | 0.000 | 0.000 | −17.985 | −17.521 | −376.474 | −7.574 |
| 4-th order coefficient (A) | −0.003 | −0.094 | −0.176 | −0.122 | −0.112 | −0.097 | −0.083 | 0.037 | −0.008 | 0.013 | −0.171 | −0.057 |
| 6-th order coefficient (B) | −0.007 | 0.215 | 0.435 | 0.337 | 0.038 | −0.033 | 0.007 | −0.005 | −0.030 | −0.039 | 0.066 | 0.018 |
| 8-th order coefficient (C) | 0.011 | −0.294 | −0.527 | −0.357 | −0.014 | 0.017 | −0.103 | −0.042 | −0.022 | 0.009 | −0.014 | −0.004 |
| 10-th order coefficient (D) | −0.045 | 0.174 | 0.315 | 0.226 | −0.017 | −0.013 | 0.159 | 0.076 | 0.031 | 0.004 | 0.002 | 0.000 |
| 12-th order coefficient (E) | 0.055 | −0.060 | −0.080 | −0.056 | 0.000 | 0.000 | −0.091 | −0.035 | −0.016 | −0.003 | 0.000 | 0.000 |
| 14-th order coefficient (F) | −0.039 | 0.000 | 0.000 | 0.000 | 0.000 | 0.000 | 0.018 | 0.006 | 0.002 | 0.001 | 0.000 | 0.000 |

A lens module according to a fifth exemplary embodiment of the present disclosure will be described with reference to FIGS. 13 through 15.

The lens module 100 according to the fifth exemplary embodiment of the present disclosure may include a first lens 10, a second lens 20, a third lens 30, a fourth lens 40, a fifth lens 50, and a sixth lens 60. Further, the lens module 100 may further include an infrared cut-off filter 70 and an image sensor 80. In addition, the lens module 100 may further include at least one stop (not shown in FIG. 13). For reference, the overall focal length f of the lens module may be 4.11 [mm].

The following Table 9 may show radii of curvature of lenses, thicknesses of the lenses or distances between the lenses, refractive indices of the lenses, and the Abbe numbers thereof. In addition, Table 10 shows aspherical constants of the respective lenses.

In the present exemplary embodiment, the first lens 10 may have positive refractive power. In addition, the first lens 10 may have a shape in which the first surface thereof is convex and the second surface is concave. The second lens 20 may have negative refractive power. In addition, the second lens 20 may have a shape in which the first surface thereof is convex and the second surface is concave. The third lens 30 may have positive refractive power. In addition, the third lens 30 may have a shape in which the first surface thereof is convex and the second surface is convex. That is, the third lens 30 may have a shape in which both surfaces thereof are convex. The fourth lens 40 may have positive refractive power. In addition, the fourth lens 40 may have a shape in which the first surface thereof is concave and the second surface is convex. That is, the fourth lens 40 may have a meniscus shape in which it is convex toward the image. The fifth lens 50 may have negative refractive power. In addition, the fifth lens 50 may have a shape in which the first surface thereof is concave and the second surface is convex. That is, the fifth lens 50 may have a meniscus shape in which it is convex toward the image. The sixth lens 60 may have negative refractive power. In addition, the sixth lens 60 may have a shape in which the first surface thereof is convex and the second surface is concave. Further, the sixth lens 60 may have a point of inflection formed on the second surface thereof.

The lens module configured as described above may have modulation transfer function (MTF) characteristics and aberration characteristics as shown in FIGS. 14 and 15.

TABLE 9

| Surface No. | Radius of curvature | Thickness or distance | Refractive index | Abbe number |
|---|---|---|---|---|
| Object | Infinity | Infinity | | |
| 1 | 1.714 | 0.57 | 1.544 | 56.1 |
| 2 | 74.643 | 0.103 | | |
| 3 | 8.716 | 0.281 | 1.632 | 23.4 |
| 4 | 2.635 | 0.308 | | |
| 5 | 11.357 | 0.653 | 1.544 | 56.1 |
| 6 | −113.86 | 0.241 | | |
| 7 | −4.491 | 0.492 | 1.544 | 56.1 |
| 8 | −1.546 | 0.212 | | |
| 9 | −1.816 | 0.36 | 1.635 | 24 |
| 10 | −1.987 | 0.1 | | |
| 11 | 7.766 | 0.716 | 1.544 | 56.1 |
| 12 | 1.313 | 0.251 | | |
| 13 | Infinity | 0.318 | 1.519 | 64.2 |
| 14 | Infinity | 0.505 | | |
| Image | Infinity | 0 | | |

TABLE 10

| Example 1 | 1 | 2 | 3 | 4 | 5 | 6 | 7 | 8 | 9 | 10 | 11 | 12 |
|---|---|---|---|---|---|---|---|---|---|---|---|---|
| Y radius | 1.714 | 74.643 | 8.716 | 2.635 | 11.357 | −113.860 | −4.491 | −1.546 | −1.816 | −1.987 | 7.766 | 1.313 |
| Conic Constant (K) | 0.022 | 0.000 | 0.000 | −1.578 | −6.264 | 1.931 | 0.000 | 0.000 | −14.321 | −15.137 | −6.474 | −8.013 |
| 4-th order coefficient (A) | −0.004 | −0.101 | −0.179 | −0.119 | −0.117 | −0.099 | −0.085 | 0.044 | −0.002 | 0.002 | −0.171 | −0.055 |
| 6-th order coefficient (B) | −0.007 | 0.215 | 0.443 | 0.345 | 0.044 | −0.024 | 0.023 | −0.006 | −0.036 | −0.032 | 0.066 | 0.017 |
| 8-th order coefficient (C) | 0.009 | −0.284 | −0.524 | −0.356 | −0.017 | 0.016 | −0.106 | −0.042 | −0.018 | 0.008 | −0.014 | −0.004 |
| 10-th order coefficient (D) | −0.044 | 0.166 | 0.310 | 0.219 | −0.016 | −0.017 | 0.157 | 0.076 | 0.031 | 0.003 | 0.002 | 0.000 |
| 12-th order coefficient (E) | 0.055 | −0.059 | −0.078 | −0.052 | 0.000 | 0.000 | −0.092 | −0.035 | −0.017 | −0.003 | 0.000 | 0.000 |
| 14-th order coefficient (F) | −0.040 | 0.000 | 0.000 | 0.000 | 0.000 | 0.000 | 0.019 | 0.005 | 0.003 | 0.001 | 0.000 | 0.000 |

A lens module according to a sixth exemplary embodiment of the present disclosure will be described with reference to FIGS. 16 through 18.

The lens module 100 according to the sixth exemplary embodiment of the present disclosure may include a first lens 10, a second lens 20, a third lens 30, a fourth lens 40, a fifth lens 50, and a sixth lens 60. Further, the lens module 100 may further include an infrared cut-off filter 70 and an image sensor 80. In addition, the lens module 100 may further include at least one stop (not shown in FIG. 16). For reference, the overall focal length f of the lens module may be 4.33 [mm].

The following Table 11 may show radii of curvature of lenses, thicknesses of the lenses or distances between the lenses, refractive indices of the lenses, and the Abbe numbers thereof. In addition, Table 12 shows aspherical constants of the respective lenses.

In the present exemplary embodiment, the first lens 10 may have positive refractive power. In addition, the first lens 10 may have a shape in which the first surface thereof is convex and the second surface is concave. The second lens 20 may have negative refractive power. In addition, the second lens 20 may have a shape in which the first surface thereof is convex and the second surface is concave. The third lens 30 may have positive refractive power. In addition, the third lens 30 may have a shape in which the first surface thereof is convex and the second surface is concave. The fourth lens 40 may have positive refractive power. In addition, the fourth lens 40 may have a shape in which the first surface thereof is concave and the second surface is convex. That is, the fourth lens 40 may have a meniscus shape in which it is convex toward the image. The fifth lens 50 may have negative refractive power. In addition, the fifth lens 50 may have a shape in which the first surface thereof is concave and the second surface is convex. That is, the fifth lens 50 may have a meniscus shape in which it is convex toward the image. The sixth lens 60 may have negative refractive power. In addition, the sixth lens 60 may have a shape in which the first surface thereof is convex and the second surface is concave. Further, the sixth lens 60 may have a point of inflection formed on the second surface thereof.

The lens module configured as described above may have modulation transfer function (MTF) characteristics and aberration characteristics as shown in FIGS. 17 and 18.

TABLE 11

| Surface No. | Radius of curvature | Thickness or distance | Refractive index | Abbe number |
|---|---|---|---|---|
| Object | Infinity | Infinity | | |
| 1 | 1.678 | 0.661 | 1.544 | 56.1 |
| 2 | 113.489 | 0.1 | | |
| 3 | 14.46 | 0.281 | 1.632 | 23.4 |
| 4 | 2.856 | 0.364 | | |
| 5 | 9.952 | 0.428 | 1.544 | 56.1 |
| 6 | 67.729 | 0.341 | | |
| 7 | −4.369 | 0.53 | 1.544 | 56.1 |
| 8 | −1.561 | 0.212 | | |
| 9 | −1.511 | 0.381 | 1.635 | 24 |
| 10 | −1.776 | 0.1 | | |
| 11 | 7.619 | 0.779 | 1.544 | 56.1 |
| 12 | 1.419 | 0.237 | | |
| 13 | Infinity | 0.318 | 1.519 | 64.2 |
| 14 | Infinity | 0.509 | | |
| Image | Infinity | 0 | | |

TABLE 12

| Example 1 | 1 | 2 | 3 | 4 | 5 | 6 | 7 | 8 | 9 | 10 | 11 | 12 |
|---|---|---|---|---|---|---|---|---|---|---|---|---|
| Y radius | 1.678 | 113.489 | 14.460 | 2.856 | 9.952 | 67.729 | −4.369 | −1.561 | −1.511 | −1.776 | 7.619 | 1.419 |
| Conic Constant (K) | 0.072 | 0.000 | 0.000 | −1.200 | −6.264 | 1.931 | 0.000 | 0.000 | −8.545 | −8.154 | −36.474 | −8.205 |
| 4-th order coefficient (A) | −0.003 | −0.098 | −0.178 | −0.118 | −0.154 | −0.125 | −0.080 | 0.051 | 0.005 | 0.000 | −0.171 | −0.055 |
| 6-th order coefficient (B) | −0.003 | 0.221 | 0.452 | 0.344 | 0.034 | −0.021 | 0.023 | −0.007 | −0.033 | −0.031 | 0.066 | 0.017 |
| 8-th order coefficient (C) | 0.012 | −0.272 | −0.514 | −0.350 | −0.018 | 0.019 | −0.103 | −0.044 | −0.017 | 0.009 | −0.014 | −0.004 |
| 10-th order coefficient (D) | −0.046 | 0.174 | 0.317 | 0.227 | −0.015 | −0.016 | 0.160 | 0.075 | 0.031 | 0.003 | 0.002 | 0.000 |
| 12-th order coefficient (E) | 0.055 | −0.060 | −0.088 | −0.055 | 0.000 | 0.000 | −0.091 | −0.035 | −0.017 | −0.003 | 0.000 | 0.000 |
| 14-th order coefficient (F) | −0.028 | 0.000 | 0.000 | 0.000 | 0.000 | 0.000 | 0.018 | 0.006 | 0.003 | 0.001 | 0.000 | 0.000 |

A lens module according to a seventh exemplary embodiment of the present disclosure will be described with reference to FIGS. 19 through 21.

The lens module 100 according to the seventh exemplary embodiment of the present disclosure may include a first lens 10, a second lens 20, a third lens 30, a fourth lens 40, a fifth lens 50, and a sixth lens 60. Further, the lens module 100 may further include an infrared cut-off filter 70 and an image sensor 80. In addition, the lens module 100 may further include at least one stop (not shown in FIG. 19). For reference, the overall focal length f of the lens module may be 4.21 [mm].

The following Table 13 may show radii of curvature of lenses, thicknesses of the lenses or distances between the lenses, refractive indices of the lenses, and the Abbe numbers thereof. In addition, Table 14 shows aspherical constants of the respective lenses.

In the present exemplary embodiment, the first lens 10 may have positive refractive power. In addition, the first lens 10 may have a shape in which the first surface thereof is convex and the second surface is concave. The second lens 20 may have negative refractive power. In addition, the second lens 20 may have a shape in which the first surface thereof is convex and the second surface is concave. The third lens 30 may have positive refractive power. In addition, the third lens 30 may have a shape in which the first surface thereof is convex and the second surface is concave. The fourth lens 40 may have positive refractive power. In addition, the fourth lens 40 may have a shape in which the first surface thereof is concave and the second surface is convex. That is, the fourth lens 40 may have a meniscus shape in which it is convex toward the image. The fifth lens 50 may have negative refractive power. In addition, the fifth lens 50 may have a shape in which the first surface thereof is concave and the second surface is convex. That is, the fifth lens 50 may have a meniscus shape in which it is convex toward the image. The sixth lens 60 may have negative refractive power. In addition, the sixth lens 60 may have a shape in which the first surface thereof is convex and the second surface is concave. Further, the sixth lens 60 may have a point of inflection formed on the second surface thereof.

The lens module configured as described above may have modulation transfer function (MTF) characteristics and aberration characteristics as shown in FIGS. 20 and 21.

TABLE 13

| Surface No. | Radius of curvature | Thickness or distance | Refractive index | Abbe number |
|---|---|---|---|---|
| Object | Infinity | Infinity | | |
| 1 | 1.627 | 0.634 | 1.544 | 56.1 |
| 2 | 76.214 | 0.104 | | |
| 3 | 8.944 | 0.281 | 1.632 | 23.4 |
| 4 | 2.428 | 0.391 | | |
| 5 | 10.941 | 0.526 | 1.544 | 56.1 |
| 6 | 1052.08 | 0.315 | | |
| 7 | −4.283 | 0.438 | 1.579 | 56 |
| 8 | −1.741 | 0.212 | | |
| 9 | −2 | 0.36 | 1.635 | 24 |
| 10 | −2.179 | 0.247 | | |
| 11 | 6.759 | 0.573 | 1.544 | 56.1 |
| 12 | 1.364 | 0.22 | | |
| 13 | Infinity | 0.318 | 1.519 | 64.2 |
| 14 | Infinity | 0.432 | | |
| Image | Infinity | 0 | | |

TABLE 14

| Example 1 | 1 | 2 | 3 | 4 | 5 | 6 | 7 | 8 | 9 | 10 | 11 | 12 |
|---|---|---|---|---|---|---|---|---|---|---|---|---|
| Y radius | 1.627 | 76.214 | 8.944 | 2.428 | 10.941 | 1052.080 | −4.283 | −1.741 | −2.000 | −2.179 | 6.759 | 1.364 |
| Conic Constant (K) | 0.075 | 0.000 | 0.000 | −0.757 | −6.264 | 1.931 | 0.000 | 0.001 | −12.781 | −10.788 | −3.474 | −8.364 |
| 4-th order coefficient (A) | −0.002 | −0.095 | −0.186 | −0.118 | −0.118 | −0.112 | −0.089 | 0.034 | 0.003 | 0.006 | −0.171 | −0.063 |
| 6-th order coefficient (B) | −0.006 | 0.219 | 0.444 | 0.339 | 0.031 | −0.017 | 0.015 | −0.014 | −0.040 | −0.039 | 0.066 | 0.020 |
| 8-th order coefficient (C) | 0.018 | −0.276 | −0.518 | −0.348 | −0.009 | 0.014 | −0.098 | −0.043 | −0.021 | 0.006 | −0.014 | −0.004 |
| 10-th order coefficient (D) | −0.049 | 0.178 | 0.321 | 0.220 | −0.020 | −0.014 | 0.158 | 0.076 | 0.031 | 0.004 | 0.002 | 0.000 |
| 12-th order coefficient (E) | 0.055 | −0.061 | −0.085 | −0.043 | 0.000 | 0.000 | −0.092 | −0.035 | −0.017 | −0.003 | 0.000 | 0.000 |
| 14-th order coefficient (F) | −0.028 | 0.000 | 0.000 | 0.000 | 0.000 | 0.000 | 0.019 | 0.005 | 0.003 | 0.001 | 0.000 | 0.000 |

A lens module according to an eighth exemplary embodiment of the present disclosure will be described with reference to FIGS. 22 through 24.

The lens module 100 according to the eighth exemplary embodiment of the present disclosure may include a first lens 10, a second lens 20, a third lens 30, a fourth lens 40, a fifth lens 50, and a sixth lens 60. Further, the lens module 100 may further include an infrared cut-off filter 70 and an image sensor 80. In addition, the lens module 100 may further include at least one stop (not shown in FIG. 22). For reference, the overall focal length f of the lens module may be 4.38 [mm].

The following Table 15 may show radii of curvature of lenses, thicknesses of the lenses or distances between the lenses, refractive indices of the lenses, and the Abbe numbers thereof. In addition, Table 16 shows aspherical constants of the respective lenses.

In the present exemplary embodiment, the first lens 10 may have positive refractive power. In addition, the first lens 10 may have a shape in which the first surface thereof is convex and the second surface is concave. The second lens 20 may have negative refractive power. In addition, the second lens 20 may have a shape in which the first surface thereof is convex and the second surface is concave. The third lens 30 may have positive refractive power. In addition, the third lens 30 may have a shape in which the first surface thereof is concave and the second surface is convex. That is, the third lens 30 may have a meniscus shape in which it is convex toward the image. The fourth lens 40 may have positive refractive power. In addition, the fourth lens 40 may have a shape in which the first surface thereof is concave and the second surface is convex. That is, the fourth lens 40 may have a meniscus shape in which it is convex toward the image. The fifth lens 50 may have negative refractive power. In addition, the fifth lens 50 may have a shape in which the first surface thereof is concave and the second surface is convex. That is, the fifth lens 50 may have a meniscus shape in which it is convex toward the image. The sixth lens 60 may have negative refractive power. In addition, the sixth lens 60 may have a shape in which the first surface thereof is convex and the second surface is concave. Further, the sixth lens 60 may have a point of inflection formed on the second surface thereof.

The lens module configured as described above may have modulation transfer function (MTF) characteristics and aberration characteristics as shown in FIGS. 23 and 24.

TABLE 15

| Surface No. | Radius of curvature | Thickness or distance | Refractive index | Abbe number |
|---|---|---|---|---|
| Object | Infinity | Infinity | | |
| 1 | 1.534 | 0.691 | 1.544 | 56.1 |
| 2 | 86.002 | 0.102 | | |
| 3 | 7.747 | 0.265 | 1.632 | 23.4 |
| 4 | 2.498 | 0.306 | | |
| 5 | −5.43 | 0.569 | 1.544 | 56.1 |
| 6 | −3.705 | 0.126 | | |
| 7 | −2.909 | 0.36 | 1.629 | 26.2 |
| 8 | −1.713 | 0.2 | | |
| 9 | −1.001 | 0.36 | 1.635 | 24 |
| 10 | −1.563 | 0.1 | | |
| 11 | 13.417 | 1.177 | 1.544 | 56.1 |
| 12 | 2.435 | 0.144 | | |
| 13 | Infinity | 0.3 | 1.519 | 64.2 |
| 14 | Infinity | 0.505 | | |
| Image | Infinity | −0.001 | | |

TABLE 16

| Example 1 | 1 | 2 | 3 | 4 | 5 | 6 | 7 | 8 | 9 | 10 | 11 | 12 |
|---|---|---|---|---|---|---|---|---|---|---|---|---|
| Y radius | 1.534 | 86.002 | 7.747 | 2.498 | −5.430 | −3.705 | −2.909 | −1.713 | −1.001 | −1.563 | 13.417 | 2.435 |
| Conic Constant (K) | 0.270 | 0.000 | 0.000 | −0.595 | −6.264 | 1.931 | 0.000 | 0.000 | −3.280 | −4.407 | 54.118 | −8.165 |
| 4-th order coefficient (A) | −0.009 | −0.075 | −0.172 | −0.125 | −0.118 | −0.170 | −0.188 | −0.017 | 0.020 | −0.001 | −0.210 | −0.059 |
| 6-th order coefficient (B) | 0.008 | 0.277 | 0.495 | 0.382 | 0.059 | −0.008 | 0.009 | 0.015 | −0.052 | −0.019 | 0.087 | 0.019 |
| 8-th order coefficient (C) | −0.012 | −0.505 | −0.793 | −0.502 | −0.043 | 0.044 | −0.139 | −0.090 | −0.013 | 0.011 | −0.028 | −0.005 |
| 10-th order coefficient (D) | −0.018 | 0.489 | 0.729 | 0.442 | −0.029 | −0.045 | 0.324 | 0.137 | 0.047 | −0.002 | 0.003 | 0.001 |

TABLE 16-continued

| Example 1 | 1 | 2 | 3 | 4 | 5 | 6 | 7 | 8 | 9 | 10 | 11 | 12 |
|---|---|---|---|---|---|---|---|---|---|---|---|---|
| 12-th order coefficient (E) | 0.041 | −0.206 | −0.298 | −0.140 | 0.000 | 0.000 | −0.200 | −0.050 | −0.044 | −0.005 | 0.000 | 0.000 |
| 14-th order coefficient (F) | −0.025 | 0.000 | 0.000 | 0.000 | 0.000 | 0.000 | 0.035 | 0.001 | 0.010 | 0.002 | 0.000 | 0.000 |

The lens modules according to the first to eighth exemplary embodiments of the present disclosure configured as described above may satisfy all of Conditional Equations 1 to 9 as shown in Table 17 and improve optical performance of the lenses.

TABLE 17

| Conditional Equation | Exemplary embodiment 1 | Exemplary embodiment 2 | Exemplary embodiment 3 | Exemplary embodiment 4 | Exemplary embodiment 5 | Exemplary embodiment 6 | Exemplary embodiment 7 | Exemplary embodiment 8 |
|---|---|---|---|---|---|---|---|---|
| TTL/F < 1.3 | 1.22 | 1.19 | 1.20 | 1.27 | 1.24 | 1.21 | 1.20 | 1.19 |
| \|V2 − V3\| < 33 | 32.7 | 32.7 | 32.7 | 32.7 | 32.7 | 32.7 | 32.7 | 32.7 |
| \|Nd4 − Nd5\| < 0.1 | 0.06 | 0.09 | 0.09 | 0.09 | 0.09 | 0.09 | 0.06 | 0.01 |
| F3/F < 60 | 59.2 | 4.7 | 4.4 | 6.4 | 4.6 | 4.9 | 4.8 | 2.0 |
| \|r9/F5\| < 0.2 | 0.06 | 0.00 | 0.00 | 0.05 | 0.01 | 0.04 | 0.01 | 0.17 |
| \|(r5 + r6)/(r5 − r6)\| < 16 | 15.1 | 1.0 | 1.0 | 1.4 | 0.8 | 1.3 | 1.0 | 5.3 |
| \|r3/F2\| < 2.6 | 0.86 | 1.71 | 2.17 | 1.33 | 1.43 | 2.54 | 1.67 | 1.30 |
| f3/f4 > 3.0 | 69.79 | 3.82 | 4.32 | 6.92 | 4.65 | 5.11 | 4.26 | 3.24 |
| V6 − V5 > 30 | 32.1 | 32.1 | 32.1 | 32.1 | 32.1 | 32.1 | 32.1 | 32.1 |

As set forth above, according to the exemplary embodiments of the present disclosure, aberrations may be easily corrected and high resolution may be implemented.

Further, according to the exemplary embodiments of the present disclosure, since an optical system may be configured only using plastic lenses, the optical system may be light and manufacturing costs of the lens module may be decreased.

While exemplary embodiments have been shown and described above, it will be apparent to those skilled in the art that modifications and variations could be made without departing from the spirit and scope of the present disclosure as defined by the appended claims.

What is claimed is:

1. A lens module comprising:
    a first lens having refractive power and having a shape in which an image-side surface is concave;
    a second lens having refractive power;
    a third lens having positive refractive power;
    a fourth lens having positive refractive power and a concave object-side surface;
    a fifth lens having negative refractive power; and
    a sixth lens having refractive power and having a point of inflection formed on an image-side surface thereof.

2. The lens module of claim 1, wherein the first lens has a shape in which an object-side surface thereof is convex.

3. The lens module of claim 1, wherein the second lens has a shape in which an object-side surface thereof is convex.

4. The lens module of claim 1, wherein the fifth lens has a shape in which an image-side surface thereof is convex.

5. The lens module of claim 1, wherein the sixth lens has negative refractive power.

6. The lens module of claim 1, wherein at least one of the first to sixth lenses is formed of plastic.

7. The lens module of claim 1, wherein at least one of an object-side surface and an image-side surface of at least one of the first to sixth lenses is an aspherical surface.

8. The lens module of claim 1, wherein an optical system including the first to sixth lenses satisfies the following Conditional Equation 1:

$$TTL/f < 1.3 \qquad \text{[Conditional Equation 1]}$$

where TTL indicates a distance [mm] from an object-side surface of the first lens to an image surface, and f indicates a focal length [mm] of the overall optical system.

9. The lens module of claim 1, wherein an optical system including the first to sixth lenses satisfies the following Conditional Equation 2:

$$|V2-V3|<33 \qquad \text{[Conditional Equation 2]}$$

where V2 indicates the Abbe number of the second lens, and V3 indicates the Abbe number of the third lens.

10. The lens module of claim 1, wherein an optical system including the first to sixth lenses satisfies the following Conditional Equation 3:

$$|Nd4-Nd5|<0.1 \qquad \text{[Conditional Equation 3]}$$

where Nd4 indicates a refractive index of the fourth lens, and Nd5 indicates a refractive index of the fifth lens.

11. The lens module of claim 1, wherein an optical system including the first to sixth lenses satisfies the following Conditional Equation 4:

$$|f3/f|<60 \qquad \text{[Conditional Equation 4]}$$

where f3 indicates a focal length [mm] of the third lens, and f indicates a focal length [mm] of the overall optical system.

12. The lens module of claim 1, wherein an optical system including the first to sixth lenses satisfies the following Conditional Equation 5:

$$|r9/f5|<0.2 \qquad \text{[Conditional Equation 5]}$$

where r9 indicates a radius of curvature [mm] of an object-side surface of the fifth lens, and f5 indicates a focal length [mm] of the fifth lens.

13. The lens module of claim 1, wherein an optical system including the first to sixth lenses satisfies the following Conditional Equation 6:

$$|(r5+r6)/(r5-r6)|<16 \qquad \text{[Conditional Equation 6]}$$

where r5 indicates a radius of curvature [mm] of an object-side surface of the third lens, and r6 indicates a radius of curvature [mm] of an image-side surface of the third lens.

14. The lens module of claim 1, wherein an optical system including the first to sixth lenses satisfies the following Conditional Equation 7:

$$|r3/f2|<2.6 \qquad \text{[Conditional Equation 7]}$$

where r3 indicates a radius of curvature [mm] of an object-side surface of the second lens, and f2 indicates a focal length [mm] of the second lens.

15. The lens module of claim 1, wherein an optical system including the first to sixth lenses satisfies the following Conditional Equation 8:

$$f3/f4>3.0 \qquad \text{[Conditional Equation 8]}$$

where f3 indicates a focal length [mm] of the third lens, and f4 indicates a focal length [mm] of the fourth lens.

16. The lens module of claim 1, wherein an optical system including the first to sixth lenses satisfies the following Conditional Equation 9:

$$V6-V5>30 \qquad \text{[Conditional Equation 9]}$$

where V5 indicates the Abbe number of the fifth lens, and V6 indicates the Abbe number of the sixth lens.

17. A lens module comprising:
a first lens having positive refractive power and having a shape in which an image-side surface is concave;
a second lens having refractive power and having a shape in which an object-side surface is convex;
a third lens having positive refractive power;
a fourth lens having positive refractive power and a concave object-side surface;
a fifth lens having negative refractive power; and
a sixth lens having refractive power and having a point of inflection formed on an image-side surface thereof.

18. The lens module of claim 17, wherein the first lens has a shape in which an object-side surface thereof is convex.

19. The lens module of claim 17, wherein the second lens has negative refractive power.

20. The lens module of claim 17, wherein the second lens has a shape in which an image-side surface thereof is concave.

21. The lens module of claim 17, wherein the fifth lens has a shape in which an image-side surface thereof is convex.

22. The lens module of claim 17, wherein the sixth lens has negative refractive power.

23. The lens module of claim 17, wherein at least one of the first to sixth lenses is formed of plastic.

24. The lens module of claim 17, wherein at least one of an object-side surface and an image-side surface of at least one of the first to sixth lenses is an aspherical surface.

25. The lens module of claim 17, wherein an optical system including the first to sixth lenses satisfies the following Conditional Equation 1:

$$TTL/f<1.3 \qquad \text{[Conditional Equation 1]}$$

where TTL indicates a distance [mm] from an object-side surface of the first lens to an image surface, and f indicates a focal length [mm] of the overall optical system.

26. The lens module of claim 17, wherein an optical system including the first to sixth lenses satisfies the following Conditional Equation 2:

$$|V2-V3|<33 \qquad \text{[Conditional Equation 2]}$$

where V2 indicates the Abbe number of the second lens, and V3 indicates the Abbe number of the third lens.

27. The lens module of claim 17, wherein an optical system including the first to sixth lenses satisfies the following Conditional Equation 3:

$$|Nd4-Nd5|<0.1 \qquad \text{[Conditional Equation 3]}$$

where Nd4 indicates a refractive index of the fourth lens, and Nd5 indicates a refractive index of the fifth lens.

28. The lens module of claim 17, wherein an optical system including the first to sixth lenses satisfies the following Conditional Equation 4:

$$|f3/f|<60 \qquad \text{[Conditional Equation 4]}$$

where f3 indicates a focal length [mm] of the third lens, and f indicates a focal length [mm] of the overall optical system.

29. The lens module of claim 17, wherein an optical system including the first to sixth lenses satisfies the following Conditional Equation 5:

$$|r9/f5|<0.2 \qquad \text{[Conditional Equation 5]}$$

where r9 indicates a radius of curvature [mm] of an object-side surface of the fifth lens, and f5 indicates a focal length [mm] of the fifth lens.

30. The lens module of claim 17, wherein an optical system including the first to sixth lenses satisfies the following Conditional Equation 6:

$$|(r5+r6)/(r5-r6)|<16 \qquad \text{[Conditional Equation 6]}$$

where r5 indicates a radius of curvature [mm] of an object-side surface of the third lens, and r6 indicates a radius of curvature [mm] of an image-side surface of the third lens.

31. The lens module of claim 17, wherein an optical system including the first to sixth lenses satisfies the following Conditional Equation 7:

$$|r3/f2|<2.6 \qquad \text{[Conditional Equation 7]}$$

where r3 indicates a radius of curvature [mm] of an object-side surface of the second lens, and f2 indicates a focal length [mm] of the second lens.

32. The lens module of claim 17, wherein an optical system including the first to sixth lenses satisfies the following Conditional Equation 8:

$$f3/f4>3.0 \qquad \text{[Conditional Equation 8]}$$

where f3 indicates a focal length [mm] of the third lens, and f4 indicates a focal length [mm] of the fourth lens.

33. The lens module of claim 17, wherein an optical system including the first to sixth lenses satisfies the following Conditional Equation 9:

$$V6-V5>30 \qquad \text{[Conditional Equation 9]}$$

where V5 indicates the Abbe number of the fifth lens, and V6 indicates the Abbe number of the sixth lens.

\* \* \* \* \*